United States Patent
Assam

(10) Patent No.: US 8,806,598 B2
(45) Date of Patent: Aug. 12, 2014

(54) SYSTEM AND METHOD FOR AUTHENTICATING A USER THROUGH COMMUNITY DISCUSSION

(75) Inventor: Brian Assam, Sioux Falls, SD (US)

(73) Assignee: Megathread, Ltd., Nederland, CO (US)

( * ) Notice: Subject to any disclaimer, the term of this patent is extended or adjusted under 35 U.S.C. 154(b) by 198 days.

(21) Appl. No.: 13/239,100

(22) Filed: Sep. 21, 2011

(65) Prior Publication Data

US 2012/0317631 A1 Dec. 13, 2012

Related U.S. Application Data

(60) Provisional application No. 61/495,292, filed on Jun. 9, 2011.

(51) Int. Cl.
*G06F 21/00* (2013.01)
*G06F 21/31* (2013.01)
*H04L 29/06* (2006.01)
*H04L 9/32* (2006.01)

(52) U.S. Cl.
CPC .............. *G06F 21/31* (2013.01); *H04L 63/08* (2013.01); *H04L 9/32* (2013.01)
USPC ............................................. 726/7

(58) Field of Classification Search
None
See application file for complete search history.

(56) References Cited

U.S. PATENT DOCUMENTS

| | | | |
|---|---|---|---|
| 7,747,746 B2 | 6/2010 | Thayer et al. | |
| 8,195,522 B1* | 6/2012 | Sonne et al. | 705/26.2 |
| 2008/0109244 A1* | 5/2008 | Gupta | 705/1 |
| 2008/0183750 A1 | 7/2008 | Lee et al. | |
| 2008/0255989 A1* | 10/2008 | Altberg et al. | 705/40 |
| 2009/0299812 A1* | 12/2009 | Ray | 705/9 |
| 2009/0320101 A1 | 12/2009 | Doyle, III et al. | |
| 2010/0088753 A1 | 4/2010 | Ayres et al. | |
| 2010/0115114 A1 | 5/2010 | Headley | |
| 2010/0122347 A1* | 5/2010 | Nadler | 726/26 |
| 2011/0022602 A1* | 1/2011 | Luo et al. | 707/748 |
| 2011/0252011 A1* | 10/2011 | Morris et al. | 707/706 |
| 2012/0158494 A1* | 6/2012 | Reis et al. | 705/14.49 |

OTHER PUBLICATIONS

Stankovic, Milan et al., "Looking for Experts? What can Linked Data do for You?", LDOW, Apr. 27, 2010, 10 pages.*
PCT International Search Report for International Application PCT/US2012/039784, search report data of mailing Dec. 21, 2013.

* cited by examiner

Primary Examiner — Jason K. Gee
Assistant Examiner — Maung Lwin
(74) Attorney, Agent, or Firm — Daniel W. Roberts; Law Offices of Daniel W. Roberts, LLC

(57) ABSTRACT

Provided are a system and method to authenticate user identities. The method includes gathering metadata from at least one discussion involving at least one pre-defined user identity on a first social network. The method evaluates the metadata of at least one third party response related to a posting by the at least one pre-defined user identity. The at least one pre-defined user identity is authenticated based on the evaluated third party response. And an indication of authentication for the at least one pre-defined user identity is provided. The system and method may also permit bridging of the established authentication between different social networks.

38 Claims, 14 Drawing Sheets

FIG. 7

User Authentication Database

| User ID | User Name(optional) | User Password | Date of Entry |
|---|---|---|---|
| Spiff | Spiff Jones | ***** | 8/23/10 |
| Dan_Man | Dan Mann | ***** | 9/15/10 |
| ... | | | |
| | | | |

User Social Networks  (User ID:Spiff)

| SN Name | SN IP Address | Username | Password |
|---|---|---|---|
| Social Media Site 1 | ... | Spiff28 | ***** |
| Social Media Site 2 | ... | Spiff_73 | ***** |
| Social Media Site 3 | ... | Spiff_jones_73 | ***** |

User Field values (User ID:Spiff)

| Field Name | Total Field Associations | Total Field Value |
|---|---|---|
| Disney | 75 | 290 |
| marathons | 68 | 128 |
| California | 22 | 60 |
| Florida | 4 | 2.5 |
| endurance events | 12 | 23 |
| surfing | 1.165 | 3.015 |
| endurance | 8 | 13 |
| paddle boarding | 1 | 0 |
| Italian food | ... | ... |
| bikes | ... | ... |
| etc... | ... | ... |

User Social Networks  (User ID:Dan_Man)

| SN Name | SN IP Address | Username | Password |
|---|---|---|---|
| Social Media Site 1 | ... | Dan_Man | ***** |
| Social Media Site 2 | ... | Dan_Man06 | ***** |

User Field values (User ID:Dan_Man)

| Field Name | Total Field Associations | Total Field Value |
|---|---|---|
| surfing | 32 | 120 |
| paddle boarding | 24 | 23 |
| endurance | 5 | 10 |
| Italian food | ... | ... |
| bikes | ... | ... |
| etc... | ... | ... |

FIG. 8

Topic Record (800)

| Topic Name | "Disney Marathons" |
|---|---|
| Source | www.disneyreviews.com/Article/disney_marathons |
| Date Of Origin | 2/25/11 |
| Users | Spiff28 | Mark2 | Tom12 | Piper1 | Teah4 |
| Fields | Disney | Marathon | Endurance | California | Florida | Social Bridge |
| Ratings Adjustment | neutral |

Topic Field Values For All Users (Topic Name: "Disney Marathons") (810)

| User ID: Spiff28 (812) | | User ID: Mark2 (814) | | User ID: Tom12 (816) | | User ID: Piper1 (818) | | User ID: Teah4 (820) | |
|---|---|---|---|---|---|---|---|---|---|
| Field | Field Value | Field | Field Value | Field | Field Value | Field | Field Value | Field | Field Value |
| Disney | 1.915 | Marathon | 0 | Florida | 0 | Social Bridge | 0.375 | Marathon | 0.5 |
| Marathon | 1.49 | Disney | 0 | Disney | 0 | Disney | 0.75 | Disney | 0.5 |
| Endurance Events | 0.383 | | | | | | | Endurance Events | 0 |
| Florida | 0.383 | | | | | | | Social Bridge | 0 |
| California | 0 | | | | | | | | |

Topic Field Values For Topic (Topic Name: "Disney Marathon") (830)

| Field | Total Values |
|---|---|
| Disney | 3.165 |
| Marathon | 1.99 |
| Social Bridge | 0.375 |
| Endurance Events | 0.383 |
| Florida | 0.383 |

FIG. 9

Topic Hierarchy (Topic_Name: "Disney Marathon")

| Hierarchy Order* | User | DOE | Entry Fields | Ratings Adj. |
|---|---|---|---|---|
| 1 | Spiff28 | ##/##/## | Disney, Endurance events, Florida, California, Marathon | neutral |
| 1.1 | Mark2 | ##/##/## | Marathon, Disney | neutral |
| 1.2 | Jill06 | ##/##/## | non-registered | neutral |
| 1.3 | Spiff28 | ##/##/## |  | neutral |
| 1.4 | Tom12 | ##/##/## | Disney | neutral |
| 1.5 | Piper1 | ##/##/## | Social Bridge, Disney | neutral |
| 1.5.1 | Alex2 | ##/##/## | non-registered | neutral |
| 1.5.2 | Teah4 | ##/##/## | Social Bridge, Disney, Marathon, Endurance Events | neutral |
| 1.5.2.1 | Mark2 | ##/##/## | Marathons, Disney | neutral |
| 1.5.3 | Alex2 | ##/##/## | non-registered | neutral |

FIG. 11

Topic Field Values For User (Topic Name: "Aloha comes to...")

| Hierarchy Order | User | DOE | Entry Field | Rating Adj. |
|---|---|---|---|---|
| 1 | Spiff_73 | ##/##/## | Surfing, Endurance, Marathon, Paddle Boarding, California, Titus Kukamunga, Tube Rider Extreme Sports | neutral |
| 1.1 | Piper | ##/##/## | Surfing | neutral |
| 1.1.1 | Spiff_73 | ##/##/## | Marathon | neutral |
| 1.1.1.1 | Jill | ##/##/## | Surfing, Marathon | neutral |
| 1.1.1.1.1 | Spiff_73 | ##/##/## | Endurance | neutral |
| 1.2 | Dan_Man | ##/##/## | Endurance, Paddle Boarding | neutral |
| 1.2.1 | Spiff_73 | ##/##/## | Paddle Boarding | neutral |

FIG. 10

Topic Record — 1000

| Topic Name | "Aloha Comes to California" | | | | | |
|---|---|---|---|---|---|---|
| Source | www.outdoormagazine.com/Article/surfing_california | | | | | |
| Date Of Origin | 3/5/11 | | | | | |
| Users | Spiff_73 | Piper | Jill | Dan_Man | | |
| Fields | Surfing | California | Titus Kukamunga | Tube rider | Extreme Sports | Paddle Boarding |
| Ratings Adjustment | neutral | | | | | |

Topic Field Values For All Users (Topic Name: "Aloha comes to...") — 1010

| User ID: Spiff_73 | | User ID: Piper | | User ID: Jill | | User ID: Dan_Man | |
|---|---|---|---|---|---|---|---|
| Field | Value | Field | Value | Field | Value | Field | Value |
| Surfing | 1.165 | Surfing | 0.94 | Surfing | 0 | Paddle Boarding | 1.0 |
| Endurance | 0 | | | Marathon | 0 | endurance | 0 |
| Marathon | 0.5 | | | | | | |
| Paddle Boarding | 0 | | | | | | |
| California | 0 | | | | | | |
| Titus Kukamunga | 0 | | | | | | |
| Tube Rider | 0 | | | | | | |
| Extreme Sports | 0 | | | | | | |

1012     1014     1016     1018

Topic Field Values For Topic (Topic Name: "Aloha comes to...") — 1030

| Field | Total Values |
|---|---|
| Surfing | 2.105 |
| Paddle Boarding | 1.0 |
| Endurance | 0 |
| Marathon | 0.5 |
| California | 0 |
| Titus Kukamunga | 0 |
| Tube Rider | 0 |
| Extreme Sports | 0 |

SYSTEM AND METHOD FOR AUTHENTICATING A USER THROUGH COMMUNITY DISCUSSION

CROSS REFERENCE TO RELATED APPLICATIONS

This application claims the benefit under 35 U.S.C. §119 (e) of U.S. Provisional Application No. 61/495,292 filed Jun. 9, 2011, the disclosure of which is incorporated herein by reference.

FIELD OF THE INVENTION

The present invention relates generally to the field of the Internet and social networking. It relates to exchange that occurs between a plurality of users and the establishment of credibility that may occur through such exchanges. This credibility as a measure of authentication can be applied to one site or across a plurality of community platforms available on the Web.

BACKGROUND

The Internet is rapidly becoming a global community of information exchange. This growth in connectivity, coinciding with the evolution of hand held devices makes Internet connectivity and socialization a growing part of our immediate, every day lives. Evolving social networks, search engines and the ability to share personal opinion through community platforms are creating an increasing social complexity that is challenged by the dynamics of the Internet's open-source architecture. This requires certain systematic standards that can address the growing concerns with privacy, identity theft, credibility and fraudulent activity, while maintaining Internet effectiveness.

Within the context of a single social network, most people are familiar with the natural and free flowing exchanges and discussions that tend to develop. Whether the topic of discussion be that of endurance sports, surfing, pets, gardening, cooking, survival tactics, dating, wine & cheese or just about anything, there seem to be no shortage of people willing to offer comment and suggestion.

Yet the recipients or later readers of such a discussion are left entirely to their own assessment for evaluating who is and is not a valid contributor. More specifically, a comment about surfing locations, boards or wax may well be offered by a life time surfer who truly knows his or her stuff, or a land locked person who has never seen the ocean and despises the surfing culture. Though perhaps an extreme example, the issues of being able to authenticate a user as truly knowledgeable becomes quite important when a parent is looking for safe birthday ideas for children, advice on nut allergies or other issues where misguided responses or even intentionally malicious responses could pose actual harm.

The frustrations with a single site are appreciated to compound when looking at multiple sites. A user very qualified for a particular subject, say marathons, may be entirely new to a site and therefore even regular contributors may not recognize him or her.

In another case, a malicious or unscrupulous user may develop a plurality of different and outwardly distinct user IDs, thus permitting him or her to present a developed discussion that is appears to involve multiple parties when in fact there is only one or very few. Such an apparent discussion may be nothing more than a soapbox podium. While certainly permissible as free speech, it would likely be very helpful to most people to have some guide to inform them that the contributors to such a discussion were unknown and their credibility therefor open to question.

Moreover, because there are a number of different social networks, each with their own autonomous definitions for users and exchange, social presence throughout the Internet is non-authentic and this is resulting in growing doubt and skepticism over the value and security of socializing the Web. This is due at least in part to two fundamental limitations; 1) centralized social networks generate community response and feedback that is only authentic within the proprietary nature of the system, and therefore, the value of community derived information cannot be integrated or utilized throughout the entire web society; and 2) by failing to support a universal source for defining the authenticity and value of individuals and information, centralized social networks are creating an insecure Internet community that lacks universal integrity.

This lack of social systematic integrity fosters malicious social intent through false accusations, inappropriate feedback, false identity, fraud, and other abuse to personal information, but also hinders Internet functionality through misinformation.

Since the Internet is an open-source architecture, Web social organization is beyond the scope of conventional approaches to social organization and this presents an extremely complex situation to network based (e.g., Internet) social networking organization.

Hence there is a need for a system and method that is capable of overcoming the above identified challenges.

SUMMARY

Our invention solves the problems of the prior art by providing novel systems and methods for a authenticating a user, and more specifically authenticating a user through community discussion.

In particular, and by way of example only, according to one embodiment of the present invention, provided is a method to authenticate user identities including: gathering metadata from at least one discussion involving at least one pre-defined user identity on a first social network; evaluating the metadata of at least one third party response related to a posting by the at least one pre-defined user identity; and authenticating the at least one pre-defined user identity based on the evaluated third party response, and providing an indication of authentication for the at least one pre-defined user identity.

In yet another embodiment, provided is a method to authenticate user identities on at least one social network including: associating metadata from a posting by a first user identity on a first social network to define at least one associated field; tracking responses to the posting by at least one third party, and in response to the third party using one or more of the associated fields, assigning a value to each associated field used; authenticating the first user identity based on the value of one or more of the associated fields; and providing an indication of the first user authentication.

Further, in yet another embodiment, provided is a system for authenticating user identities including: at least one user account, the user account identifying at least a first social network and an associated known user identity; a metadata gatherer structured and arranged to gather metadata from at least the first social network regarding each known user identity, the gathered metadata including at least one field obtained from at least one posting by a known user identity and subsequent third party responses to the known user identity; a database structured and arranged to associate the at least one field to the known user identity; and an authenticator structured and arranged to authenticate each known user identity by assigning a value to at least a portion of the metadata of each third party response.

In yet another embodiment, provided is a social networking bridge for authenticating user identities including: a bridge structured and arranged to review a plurality of social networks, the bridge having; at least one user account, the user account identifying at least one social network and an associated known user identity; a metadata generator structured and arranged to gather metadata from each social network regarding each known user identity, the gathered metadata obtained from at least one discussion and subsequent discussions involving each known user identity; a database structured and arranged to correlate the gathered metadata to each known user identity; an identity authenticator structured and arranged to authenticate each known user identity based on evaluating metadata of at least one third party response related to a posting by the known user identity.

Further still in another embodiment, provided is a non-transitory machine readable medium on which is stored a computer program for authenticating a user, the computer program comprising instructions which when executed by a computer system having at least one processor performs the steps of: gathering metadata from at least one discussion involving at least one pre-defined user identity on a first social network; evaluating the metadata of at least one third party response related to a posting by the at least one pre-defined user identity; and authenticating the at least one pre-defined user identity based on the evaluated third party response, and providing an indication of authentication for the at least one pre-defined user identity

BRIEF DESCRIPTION OF THE DRAWINGS

At least one method and system for authenticating a user of at least one site, through community discussion will be described, by way of example in the detailed description below with particular reference to the accompanying drawings in which like numerals refer to like elements, and:

FIG. 7 illustrates exemplary database entries for known User identities, social networks and Fields in accordance with at least one embodiment;

FIG. 8 illustrates exemplary database entries for the Topic and Fields of the discussion shown in FIG. 3 in accordance with at least one embodiment;

FIG. 9 illustrates the hierarchy of Responses for the discussion shown in FIG. 3 in accordance with at least one embodiment;

FIG. 10 illustrates exemplary database entries for the Topic and Fields of the discussion shown in FIG. 5 in accordance with at least one embodiment;

FIG. 11 illustrates the hierarchy of Responses for the discussion shown in FIG. 5 in accordance with at least one embodiment;

DETAILED DESCRIPTION

Figure 1:
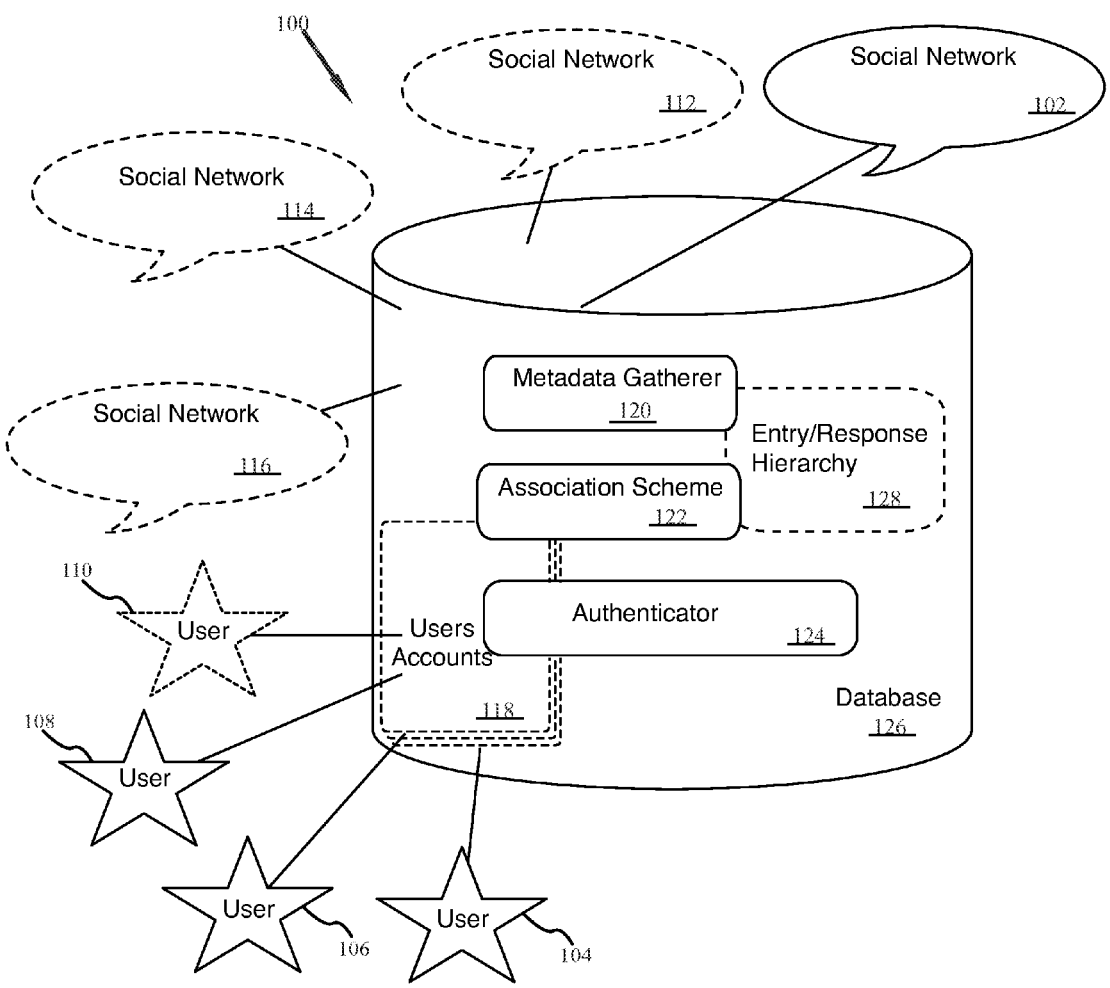
FIG. 1 illustrates a high level conceptual view of the Authentication System in accordance with at least one embodiment.

Before proceeding with the detailed description, it is to be appreciated that the present teaching is by way of example only, not by limitation. The concepts herein are not limited to use or application with a specific system or method for authenticating a user, and more specifically authenticating a user through community discussion. Thus although the instrumentalities described herein are for the convenience of explanation shown and described with respect to exemplary embodiments, it will be understood and appreciated that the principles herein may be applied equally in other types of systems and methods involving the authentication of a user.

To further assist in the following description, the following defined terms are provided.

"Entry"/"Response"—The data provided by a user to start a posting or in response to a posting on an Internet based social network site, and/or community platform. For example, but not limited to, a post, article, tweet, like, dislike, rating, product, picture, comment, or other indication or expression of an opinion of any separable entity involved in the Web. Moreover, the data may be textual—as in a written comment, non-textual—as in a "Like" or a "Thumbs Up", or a combination of textual and non-textual elements such as a textual Response that includes a rating scale.

"User"—He or she who is providing the data in an Entry/Response.

"Topic"—Topic's form threaded discussions based upon specific topics of interest. They are subjects that draw others users to respond to the data posted by users, and are defined by an initial entry, article, post, blog, tweet, product, or anything that can be responded to, rated, or commented on, that would start a threaded discussion.

"Metadata"—This is data about data and relates to Tags, or Key Words, that are extracted and recognized within this system and method as Fields. Indeed, the metadata may be the data itself as directly provided by a User in an Entry/Response, an indicator such as a rating (like or dislike, thumbs up or thumbs down, etc. . . . ), and data associated with any form of an Entry/Response, such as but not limited to, the site IP, date, time, author, last editor, etc. . . .

"Field(s)"—Are relational entities such as Metadata, tags, or "key words" as are commonly understood in searching and organizing data. Fields are defined from an Entry/Response through information generated from the information provided by the source of Entry and all Responses to that Entry.

Fields can be generated by the 3rd-party social network, Users, or the Social Network Bridge. These may be one or more terms. Fields create universal Metadata that is specific to the Social Network Bridge and can be utilized across a plurality of social networks in order to recognize User Associations to interests (quantified as Fields) and their Authentication, which is the sum of their Field Value to those Associations.

"Associations"—Occur between Users and defined Fields and once they are defined they are universal to the Social Network Bridge. This allows User to be associated with other Users through Associations to similar Fields. The number of Associations a User has over the Social Networks Bridge defines a value based on the "span" of Fields, or their scope of interests across the Social Network Bridge.

"Field Value"—Is the value applied to a Users Association to a Field. Field Value is increased through subsequent responsive posting to a User Entry/Response that generates Field(s). Moreover, a Field in a new original Entry, or a new Field to an existing discussion has no Field Value. As discussed below, for at least one embodiment the value is based on the frequency of Responses overall, the Ratings from those Responses, as well as the frequency of Field usage in subsequent Responses. The overall Field Value applied to a User in Association to a Field is the aggregate of all Field Values defined through discussions that relate to that Field.

"Field Average"—The percentage associated to a Field for it's subsequent use in one or more responsive postings as compared to the other Fields in subsequent Responses in a discussion.

"Span"—The value of the number of Associations of Fields to a registered User.

"Depth"—The aggregate of Field Value to each Associated Field for a registered User.

"Authentication"—A degree of validation subscribed to a registered User of the Authentication System regarding his or her established Associations to one or more Field(s), and including subsequent defined Field Value, as validated by 3rd party Responses. For at least one embodiment, the Authentication is based at least in part on the Span, the number of associations, and the Depth, the degree of Field Value in relation to each association.

"Social Network Bridge"—the system or method embodying the invention herein disclosed. Though fully adaptable for application to a single site, the "bridge" nature is most fully appreciated with the cross linking of Users registered with the Social Network Bridge across a plurality of social networks based on Topics, Fields and Field Values as used by the Social Network Bridge to provide an indication of registered Users degree of Authentication.

"Social Network" as used herein is also understood and appreciated to be any community platform where Users are identified by some form of UserID and make some level of exchange between themselves through Entry/Response. In other words a social network is appreciated to be any Internet based system that provides any form of media (i.e., posts, blogs, articles, products, pictures, audio commentary, music, pictures video, etc. . . . ), which can be responded to by identified users of that system. Indeed it is to be understood and appreciated that in addition to traditional web applications typically considered to be social networking services, as used herein a social network also is understood and appreciated to encompass email, pages, tweets and other such forms of communication exchange between users. Moreover, in some embodiments the social network may be described as a community platform.

"Ratings Adjustments"—Ratings adjustments may be involved in defining Field Value because different $3^{rd}$ party social networks having different styles of ratings. Examples include no rating at all, "star" ratings scales, binary rating scales (such as like/dislike, thumbs up/thumbs down, etc.) single command ratings (such as "Like" "Recommend", "Retweet", etc.), among others. A Ratings Adjustment can be determined and applied to the Field Value for each differing rating scale that accompanies an Entry/Response. Ratings are beneficial in their ability to distinguish positive or negative levels of feedback in order to derive more appropriate Field Value.

"Entry/Response Hierarchy"—The Entry/Response Hierarchy is defined through Entry's and subsequent Responses that create threaded discussions that relate to a specific Topics of Interest. Every time a new original Entry/Response is made, a new Hierarchy can be created. Every time an Entry/Response is made in relation to an existing Hierarchy, the Hierarchy is adjusted for that Entry/Response. The Entry/Response Hierarchy is used to define the levels of discussion in order to determine appropriate Field Value for branching out discussions.

To briefly summarize, provided is a system and method for authenticating User identities. This Authentication is in essence based upon $3^{rd}$ party Responses and not a Users own statements of self worth or Authentication. Moreover, it is a system and method that involves gathering metadata from at least one discussion involving at least one pre-defined User identity on a first social network. The metadata of at least one third party Response relating to a posting by a pre-defined User is then evaluated. The pre-defined User identity is then authenticated based on the evaluated third party Response, and an indication of the Authentication for the pre-defined User is then provided.

Moreover, for at least one embodiment, the Authentication System has the ability to receive information and more specifically, information that defines Fields through metadata, tags and key words, including information that defines ratings. In at least one embodiment this information also includes the designation of a Topic, which as stated in the definitions above is the initial Entry/Response that would start a topic of discussion. Indeed a Topic may be truly an initial posting which starts a discussion, or a new Topic may occur in a subsequent Response where a new issue for discussion is introduced. Each topic and the Entry/Response regarding the Topic are arranged in an Entry/Response Hierarchy so as to be associated with at least one known User.

The Authentication System determines a value, e.g., an Authentication value, for the known User in relation to the Field(s) associated to each Entry/Response. This Field Value is generally determined by the hierarchical order that is created by subsequent Responses, both direct and indirect, to the Users Entry/Response and all subsequent Entry/Responses (as in Responses to other Responses). Authentication for the known User is then based on evaluating the Field Value as collected from at least one $3^{rd}$ party Response relating to the posting by the known User. In varying embodiments, before the Field Value is applied to achieve User Authentication, the Field Value is adjusted by the Ratings Adjustment and the Field Average.

FIG. 1 is a high-level block diagram of an embodiment of the Authentication System 100. As shown the Authentication System is in communication with a first social network 102, and at least one or more Users, of which Users 104, 106, 108 and 110 are exemplary. In at least one embodiment, the Authentication System 100 is a component of the first social network 102.

The first social network 102 and the Authentication System 100 are understood and appreciated to be one or more computer systems, (including microprocessors, memory, and the like) adapted at least in part to provide the first social network 102 and the Authentication System 100. More specifically each may be a general computer system adapted to operate as a social network, such as first social network 102 and/or the Authentication System 100, or a specialized system that is otherwise controlled by or integrated with a computer system.

For such embodiments, Users 104, 106, 108 and 110 may be identified as known or registered Users on the basis of having established accounts with the first social network 102. In such embodiments, the Users of the first social network and more specifically the Authentication System 100, may not need to provide additional information to the Authentication System 100 to permit monitoring and Authentication to occur as their respective associated User identities are already known as are the parameters of the first social network 102.

In varying embodiments, Users 104, 106, 108 and 110 may become known or registered Users by establishing users accounts 118 directly with the Authentication System 100. For embodiments wherein the Authentication System 100 is in communication with a plurality of social networks, e.g., first social network 102 and one or more second social networks 112, 114, 116, additional access information for all of social networks may be provided by the User in his or her User account 118.

In addition, each User account 118 may define one or more User identities that are associated with the known User in various different social networks. Moreover, for at least one embodiment, the User accounts 118 define for the Authentication System 100 the User identities to be monitored, evaluated and authenticated upon one or across many social networks.

In at least one alternative embodiment, the Authentication System 100 is distinct from the social network 102. Further, whether a component of the first social network or distinct from the first social network, in varying embodiments the Authentication System 100 is also in communication with a plurality of second social networks, of which second social networks 112, 114 and 116 are exemplary.

To facilitate this, in at least one embodiment, the Authentication System 100 has a metadata gatherer 120, an association scheme 122, an authenticator 124 and a database 126

The Metadata Gatherer 120 in connection with the information provided in the User accounts 118 monitors community activity within at least the first social network 102. When any User established with the Authentication System 100 makes an Entry or Response, the Authentication System 100 gathers, via the metadata gatherer 120, appropriate data from the Entry or Response and the subsequent Responses. This includes attributes such as date and time, user name, message content, tags, key words, ratings information, etc. . . . Moreover the data from the Entry or Response may be any data associated with the Entry or Response—that which is provided directly as the textual or non-textual Entry or Response or that which is supplementary to the Entry or Response.

In at least one embodiment, the gathered metadata will include at least one Field obtained from at least one posting by a known User identity and subsequent third party Responses to the known User identity. The database 126 is structured and arranged to record the association of at least one Field to the known User identity. For embodiments where the User account 118 are not specifically maintained by the first social network 102, the database may further be structured and arranged to maintain the User accounts 118 as well.

As is further explained below, for at least one embodiment, if the Authentication System 100 determines that the User posting the Response is not a known or registered User, the Authentication System 100 may invite the User to become a registered User and therefore also enjoy the benefit of Authentication.

Metadata, tags, and "key words" generated from the Topic, and the Entry/Responses to the Topic as text become Fields and permit the Authentication System 100 to establish relationships between other registered Users through Associations to Fields derived from the Entry/Response within the discussion. Data generated from non-registered Users enters the Entry/Response Hierarchy in order to maintain the flow of discussion in relation to Topics. However, in at least one embodiment as the User is not a registered User, the entry of the data does not create Associations or Field Values related to the unregistered User.

The Association Scheme 122 recognizes the Associations between registered Users and defined Field(s). The Authentication System 100 builds an aggregate of Associations based upon how many times a specific Field has been referenced per unique Topic of Discussion by a User. This builds an Authenticating element known as Span Value, or the scope of different Associations. Each Association acts as a reference between Users and their associated Fields. Where the Authentication System 100 is in communication with a plurality of social networks, this reference of Association is viable across the social networks upon which the User is active.

In varying embodiments, the metadata gatherer 120 and/or the association scheme 122, alone or in varying degrees of combination may establish the Entry/Response Hierarchy 128 as a substantially distinct component of the general database 126.

The Authenticator 124 determines Field Values for each Entry/Response based on Depth of subsequent User Response. This Field Value is triggered by each subsequent Response, and is adjusted by order in the Entry/Response Hierarchy, Ratings Adjustment, and Field Average.

The Authentication, or lack thereof, is at least one output from the Authenticator 124 and in varying embodiments can be used in a variety of forms. For example, in at least one embodiment, the Authentication of a registered User is directly evident to all Users of a social media site when the Authenticated registered User offers an Entry/Response containing a Field for which he or she has an associated.

With respect to FIG. 1, it is understood and appreciated that the elements, e.g., metadata gatherer 120, the association scheme 122, the Authenticator 124 and the database 126 are in one embodiment located within a single device, such as for example a computer. In at least one alternative embodiment, these elements may be distributed over a plurality of interconnected devices. Further, although each of these elements has been shown conceptually as an element, it is understood and appreciated that in varying embodiments, each element may be further subdivided and/or integrated within one or more elements.

FIGS. 2-9 provide a high level flow diagram with conceptual illustrations for a discussion upon an exemplary social network site, e.g., first social network 102, and subsequently at least one additional social network site, e.g., second social network 112. It will be appreciated that the described events and method need not be performed in the order in which it is herein described, but that this description is merely exemplary of one method of implementing a method to achieve the Authentication System 100, or more specifically a method of authenticating User identities upon one or a plurality of social networks.

In addition, for ease of illustration and discussion the use of textual discussions have been shown, however it is to be understood and appreciated that other options for media, such as but not limited to one or more pictures, movies, audio files, songs, or even links to other media may be used at least as part of the initial posting. Often, with such media, there is also a clearly identified subject—such as a caption or title. When this exists, the subject is recognized by the Authentication System 100 and method 200 as the Topic. Of course, it is further understood and appreciated that where the posted media is non-textual, metadata may still be collected, such as but not limited to the type of media, time of posting, source of posting, and the Topic itself.

Moreover, if the nature of the discussion is such that a title, aka Topic, is clearly provided, the Authentication System 100 and method 200 accept that as the Topic. If the nature of the discussion is such that a title, aka Topic, is not clearly provided, the Authentication System 100 and method 200 accept the as one or more of the associated Fields defined within the first level post by a registered User.

It is also understood and appreciated that the methodology of Authentication may take many forms. The total number of Responses to an initial posting may be simply tallied, direct Responses may be valued differently from indirect Responses, heuristics may be applied to gage a Response as being positive or negative or neutral, (note: a key component of this system is that it does not need, or use, objective user information such as age, sex, etc.). Different methodologies for Authentication may also be established for different embodiments of Authentication System 100. With respect to the discussion herein, it is understood and appreciated that the description of Authentication is merely exemplary of one method of operation in accordance with the present invention, and not a limitation.

Figure 2:
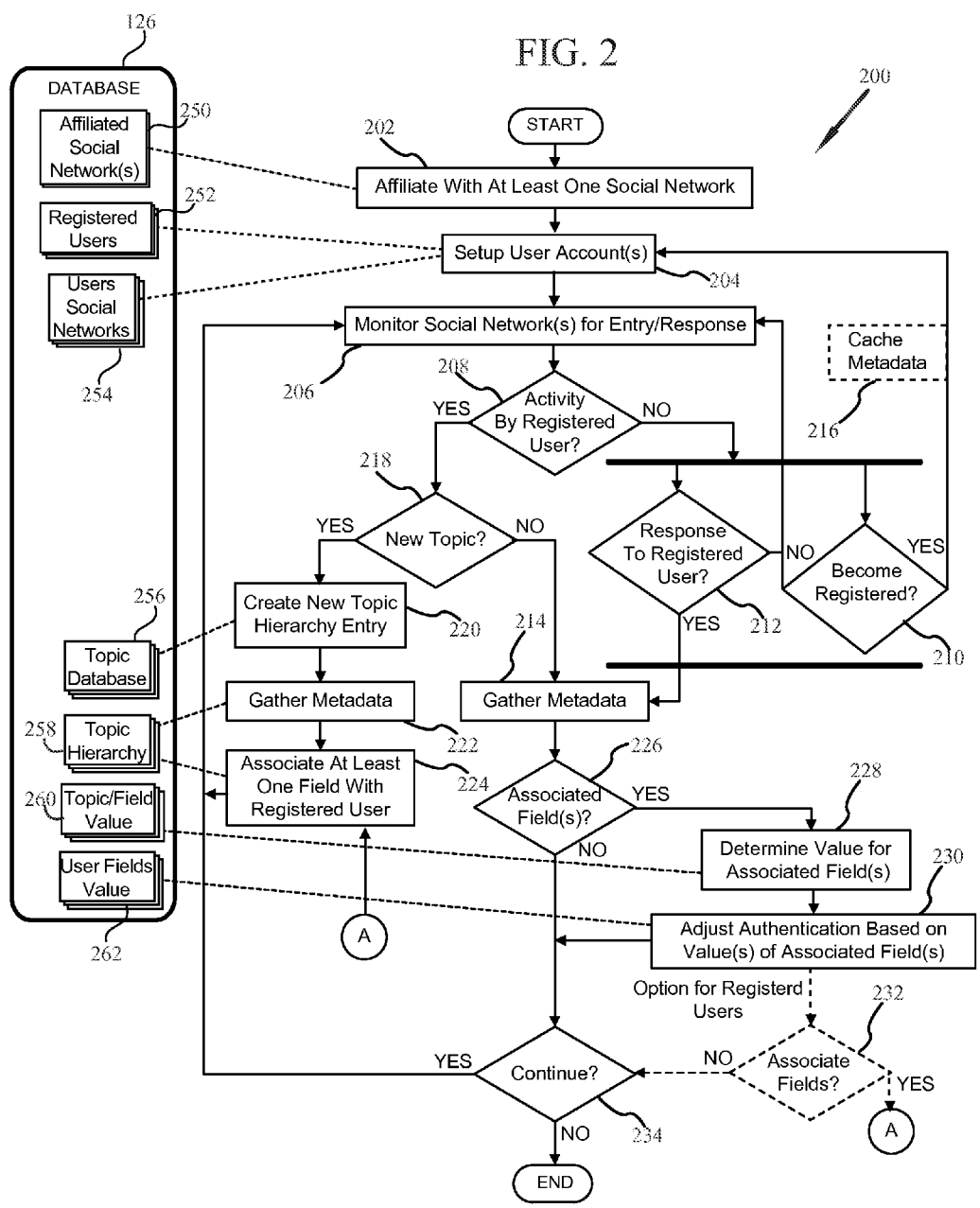
FIG. 2 is a flow diagram illustrating a method of Authentication in accordance with at least one embodiment.

With respect to FIG. 2, in addition to illustrating the steps of the method 200, there is an attempt to further illustrate in general which elements of Authentication System 100 are in play at different stages. Accordingly along the left side of the flow diagram is presented a conceptualization of a database, such as database 126, and the correlated elements within the database.

The Authentication System 100 is, as noted above for at least one embodiment, implemented to provide User Authentication across a plurality of social networks. In such settings, the Authentication System 100 is more fully appreciated as a Social Network Bridge ("SNB"). It is understood and appreciated that even where multiple social networks are involved, Authentication can and does occur on individual social networks.

More specifically, when multiple social networks are involved, the SNB accounts for actions on all networks in authenticating User identities. These actions upon different social networks may be contemporaneous, or they may alternate in different time periods. Moreover, for the process of Authentication, concurrent action upon multiple social networks is not required. In addition, it is well within reason to understand that a registered User may only be active on one social network site, and still enjoy the advantageous benefit of Authentication.

As such, in the following description the methodology for Authentication is presented with respect to one social network, e.g., first social network 102, before demonstrating how the SNB may be expanded to present Authentication across multiple social networks.

Authentication for a Single Social Network

As shown in FIG. 2, the method 200 commences with affiliating with at least one social network, block 202. For an embodiment where the Authentication System 100 is implemented directly as a component of a social network, such as first social network 102, the Users of the first social network may all be identified as known or registered Users with no further action, block 204.

For at least one alternative embodiment, whether integrated as a component of the social network or not, a User sets up his or her account and provides at least his or her associated User identity and such other relevant information regarding the social networks he or she uses, block 204.

With respect to the database 126, FIG. 2 illustrates that, for varying embodiments, the database 126 receives and records the basic information, such as affiliated social network(s) (records of affiliated social network(s) 250), a listing of registered or known Users (records of registered Users 252), and a listing of each User's social network(s) (records of social networks affiliated with Users 254). These records may certainly be combined, but have been shown distinctly for ease of discussion.

FIG. 7 illustrates conceptual database records. Specifically, table of records 700 correlate to the listing of registered Users (records of registered Users 252) and illustrate the User accounts. A first registered User 702 is shown as Spiff Jones and a second registered User 704 is shown as Dan Mann. Additional registered Users are not shown for ease of illustration.

Table of records 706 conceptually correlate to the listing of the User's social networks (records of registered Users 252) and specifically illustrate the social networks with which User Spiff is associated. As shown, for each social network, the registered User, e.g. Spiff, may use a different Username 708. Moreover, as Authentication is established for User Spiff, the Authentication will be reported across all associated social networks regardless of username, if Spiff Jones is active upon more than one social network that has been registered with the Authentication System 100.

Returning to FIG. 2, the Authentication System 100 then commences to monitor the specified social network or networks awaiting action by a registered User, block 206. For at least one embodiment, there may be Users who are not registered Users of the Authentication System 100, decision 208, and if so these initial postings by such unregistered Users are ignored, and the Authentication System remains in a monitoring state, block 206.

For at least one optional embodiment, postings by unregistered Users are trapped to initiate an offering for these Users to become registered Users, decision 210. This may be accomplished by initiating a new pop-up, application or appliance that informs the User of the presence of the Authentication System, its function, features and benefits and how Authentication is achieved.

If the un-registered User accepts the offer to become a registered User, he or she is then directed to the process of setting up his or her account, block 204. His or her Entry/Response may also be cached during this account set up process so that upon enrolling in the Authentication System he or she is given immediate credit for his or her Entry/Response. Of course, if he or she opts not to accept the offer to become Authenticated, the method continues and the un-registered User is simply treated as an un-registered User.

In certain embodiments, Responses by non-registered Users can be used in the Authentication process, if such a Response is related to a prior posting by a registered User, decision 212. Where the posting is indeed a Response, metadata may be gathered, block 214, else the Authentication System remains in a monitoring state, block 206. Moreover, for at least one embodiment, all third party Responses are evaluated in determining Authentication for a User regardless of whether the third party is a registered or unregistered User. For at least one alternative embodiment only third party Responses from registered Users are in determining Authentication for a User, and for yet still another embodiment, Responses from un-registered users are in determining Authentication for a User, but may be evaluated with less value then Responses from registered Users.

As is further explained below, the Authentication System 100 and method 200 are adapted in at least one embodiment to act and Authenticate upon the occurrence of non-textual Responses, however for ease of illustration and discussion, textual Response are first considered.

When activity by a non-registered user is detected, in at least one embodiment, the Authentication System moves to determine if the action is in Response to a posting by a registered User, decision 210. The unregistered User may also be given an opportunity to become a registered User, decision 212. In response to accepting this offer, the new User is directed back to the process of setting up a User account, block 204. The metadata from the Users posting may be cashed as indicated by dotted block 216.

When a registered User does initiate an Entry/Response, the Authentication System 100 recognizes that Entry/Response, decision 208, and moves to the determination of whether the Entry/Response establishes a new Topic, decision 218. As noted above, a Topic name may be a Field within an initial posting which starts a discussion, or a clearly identified subject provided to identify the posted media. For at least one alternative embodiment, a Topic may be identified when a registered User is a subsequent responder to prior un-registered users. And, for yet another embodiment, a subsequent by a registered user may introduce a new Topic as well as.

Figure 3:
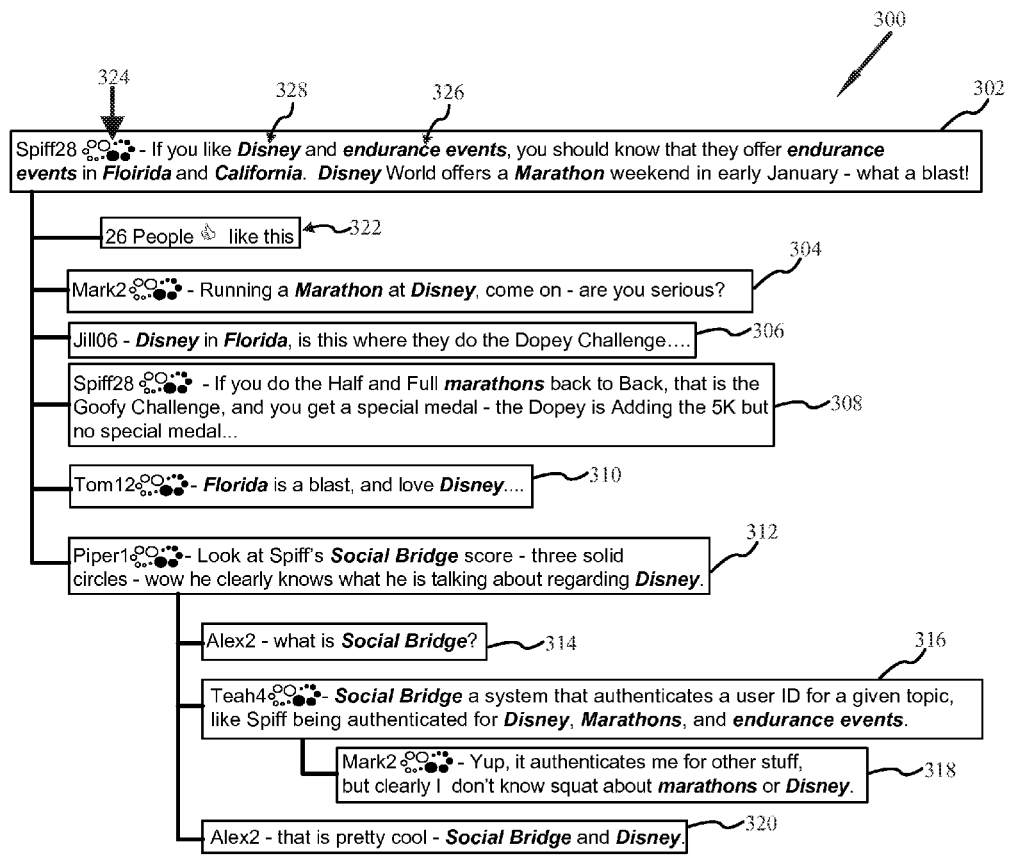
FIG. 3 is a conceptual illustration of a discussion on a first social network and at least one known user identity participating in the Authentication process in accordance with at least one embodiment.

FIG. 3 conceptually illustrates at least a portion of discussion 300 that has evolved on social network site, e.g., first social network 102. Registered User Spiff28 has posted a new Entry 302 as a Topic for discussion. There are nine (9) subsequent text Responses, 304, 306, 308, 310, 312, 314, 316, 318 and 320 of which Responses 304, 306, 308, 310 and 312 are direct Responses to Spiff28's initial Entry 302, and Responses 314, 316, 318 and 320 are indirect in that they are responding to Response 312 by Piper1. There are also non-textual Responses 322 showing that 26 people "like" the discussion initiated by Spiff28. In at least one embodiment, for some Users, such as Spiff28 there is also an indicator 324 of the User's participation in the Authentication System 100.

Although shown in FIG. 3 as a generally complete discussion 300, it is understood and appreciated that discussions such as this evolve over time. For at least one embodiment of the Authentication System 100 it is anticipated that the Authentication System 100 and method 200 will operate in substantially real time—monitoring the social network(s) and Authenticating registered Users as discussions occur. For at least one alternative embodiment, Authentication System 100 and method 200 are adapted to review historical discussions.

In the textual Entry/Responses 302, 304, 306, 308, 310, 312, 314, 316, 318, and 320 some words are shown in Bold Italics to indicate they are Fields, of which "endurance event" is an exemplary Field 326. In at least one embodiment the Authentication System 100 and method 200 act automatically, such as by implementing heuristics, to recognize Fields. A registered User may also specifically identify a Field, or un-identify a Field, the subsequent use of that term or phrase in a Response being automatically recognized. The 3rd party social network itself can also recognize these Fields for Each Entry/Response.

With respect to the initial Entry 302 by Spiff28, in varying embodiments the Authentication System may also use heuristics to identify the Topic, or the registered User may indicate the Topic. In the case of Entry 302, for ease of discussion and illustration, the exemplary Fields 326 of Disney, endurance events, Florida, California, and Marathon have been shown in Bold Italics. For the sake of example, the Topic 328 of this Entry by Spiff28 is initially identified as Disney. For further clarification and identification to interested parties, in at least one embodiment, the initiating registered User, e.g., Spiff28 may adjust the Topic as identified. In other words, Spiff28 may further indicate that his specified Topic is "Disney Marathon" rather than simply "Disney."

For this example it is assumed that Spiff28 has an established history of past discussions involving Disney. Other users may or may not have established histories as well. Regardless of past history, for purposes of this example, discussion 300 is new and as such the Topic of Disney Marathons is a new Topic, and therefore a new Topic hierarchy entry is created, block 220. This is further illustrated by the dotted line reaching the Topic Database 256 within the database 126. It should be understood and appreciated that over time multiple discussions with substantially the same Topic name may occur. Although the history of Fields may be aggregated in Authenticating the registered User, maintaining the distinction of each as a distinct Topic may be desired in some embodiments, such as for, but not limited to, permitting historical searching and review of Topics that may be of interest to a user.

In FIG. 8, table of records 800 conceptually illustrates a database entry for the new discussion Topic as initiated by Spiff28. More specifically a record, such as table of records 800 is generated for each new topic of discussion. The information recorded is understood to be adaptable for varying embodiments, and is shown for example to include, but not otherwise be limited to, the topic name, source, date, Metadata to be used as Fields, and whether or not a ratings adjustment is to be applied. The Ratings Adjustment is set to permit different types of rating styles to be compared—e.g., thumbs up and thumbs down to a range of stars, or even no rating at all, in which a neutral setting of 50% can be applied.

Metadata from the Entry/Response is also gathered, block 222, and is correlated in the topic hierarchy 258, further shown as table of records 900 in FIG. 9. In at least one embodiment, at least one Field, e.g., Disney, is associated with the registered User having the User identity Spiff28, block 224.

Other Fields as identified by Spiff28 or the Authentication System 100, e.g. endurance events, Florida, California, and Marathon are also associated with the registered User ID of Spiff28, and may in their own right in varying embodiments be treated as Topics, or sub-Topics. Table of records 710 in FIG. 7 conceptually illustrates the Fields associated with User ID Spiff, and as is apparent, includes a total sum of Field Value from discussions other than that shown in FIG. 3. Additional tables of records are also created for each other registered User involved in the discussion, but are not shown. Of course, for some embodiments, certain words or phrases can not be designated as Fields—for example "the" as a Field is generally considered off-limits.

Table of records 710 is used to recognize a User's overall value for every association with an associated Field. The Field name is the name given to the defined metadata, tags, and or key words generated from discussions, at least a subset being the identified Fields 326 in FIG. 3. The Total Field Associations is the total number of times a User has created an Association to a Field for each unique Topic of discussions, and reflects the Span Value for that User. The total Field Value is the value generated from all discussions for that Field, and reflects the Depth Value for that User.

With specific reference to table of records 710, Fields 712 correlate to the Fields identified by Spiff28 in connection with the discussion as shown in FIG. 3 and Fields 714 correlate to Fields identified in other separate discussions. It is understood and appreciated that these other discussions may be discussions within the first social network 102 or other social networks. Of course, additional data regarding the specific social network from which the data in the Entry is being captured, time of day, etc. . . . may also be captured and recorded.

Having associated at least one Field with the registered User, block 224, the method returns to monitoring the social network(s) for further Entry/Response, block 206. As noted above, an advantageous nature of the Authentication System 100 is the fact that a registered Users Authentication is developed at least in part through the actions and postings of 3rd parties.

Moreover, if Spiff28 posts again and again about Disney, he will not spontaneously generate an Authentication for Disney, rather other Users must respond to his postings for his credibility to be established. Indeed, with respect to FIG. 3, Response 308 is identified as from Spiff28—the same registered User who posted initial Entry 302. This occurrence is detected by the Authentication System 100 and this entry is nullified for User Spiff with respect to Response 308.

Responses by third parties to postings are therefore of significant importance. The Authentication System 100 therefore monitors for a Responses to existing postings. In at least one embodiment this is facilitated by identifying the activity by a registered User as being other than an initial posting with a new topic, decision 218. If no Responses are provided by other Users the Authentication System 100 simply maintains a monitoring state and no Authentication is established or further established with respect to the registered Users posting.

For at least one embodiment, the Authentication System 100 and method 200 are structured and arranged to authenticate registered User identities based at least in part on determining the number of Responses by $3^{rd}$ parties and the number of times one or more Fields associated with the registered User are used in those Responses. Non-textual Responses, e.g., a like or dislike, thumbs up thumbs down, happy face or sad face, or the like may also be accounted for and, in certain embodiments even distinguished as being provided by registered or non-registered Users.

Moreover, for each subsequent Response by another registered User, and in some embodiments non-registered Users, the Authentication System 100 acts to gather information, including Metadata from each Response, block 214. With respect to textual Responses, a query is performed to check each Response for the use of one or more associated Fields, decision 226.

For at least one embodiment, the Authentication value for the exemplary discussion of FIG. 3 is based on at least three factors:
1) the number of subsequent Responses and their type—directly subsequent as in the case of Responses 304, 306, 310 and 312, and indirectly subsequent as in the case of Responses 314, 316, 318 and 320;
2) the Field Average, and
3) the Ratings Adjustment, which is set to neutral (50%) as shown in table of records 800.

Where a subsequent Response is determined to have at least one associated Field, the method 200 proceeds to determine a value for each associated Field, block 228 and adjust the Authentication for the registered User based on the value(s) of the associated Field(s), block 230. These values are then recorded in the Topic/Field value 260, further shown as table of records 810 corresponding to the Topic Field Values for all Users, and User Fields Value 262, further shown as table of records 830 corresponding to the Topic Field Values For User, in FIG. 8.

It is understood and appreciated that non-textual Response may also occur as are shown in FIG. 3 as Response 322 indicating that 26 people have "Liked" the discussion. As these Responses are non-textual in most embodiments the metadata may not include any associated Fields. Still, these Responses can and in at least one embodiment are detected and accounted for in the determination of Authentication as is further discussed below.

With respect to FIG. 3, and for the ease of discussion, the evaluation for Authentication can be reviewed in aggregate. And, for at least one embodiment, such as is shown direct Responses are evaluated with a higher value and indirect Responses are evaluated with a lower value. In FIG. 3 there are five $2^{nd}$ level Responses, 304, 306, 308, 310 and 312. There are also three $3^{rd}$ level Responses, 314, 316 and 320, and one $4^{th}$ level Response 318.

However, since Jill06, and Alex2, are not registered Users, their Entry/Response's 306, 314 and 320 do not generate Associations to Fields, nor add to the aggregates that determine Field Value. Their entries may be considered in the Entry/Response Hierarchy structure. For example a Response by an unregistered User may generate subsequent Responses by registered Users.

It should also be understood and appreciated that in varying embodiments, heuristics, such as for example analytical algorithms may be applied to Responses in an effort to determine a positive or negative nature for the Response which may also be included in evaluating the Response. In other words, trapping "thanks for your help" or "fantastic advise" may in certain embodiments enhance the Authentication valuation, whereas trapping "your clearly clueless" or "inane" may in factor into reducing the Authentication valuation. Further, for at least one embodiment the Authentication System 100 performs a comparison of how many times the designated Field(s) appear relative to other terms or words so that a Response will not skew the Authentication simply by repeating the Field Disney one-hundred times.

Figure 6:
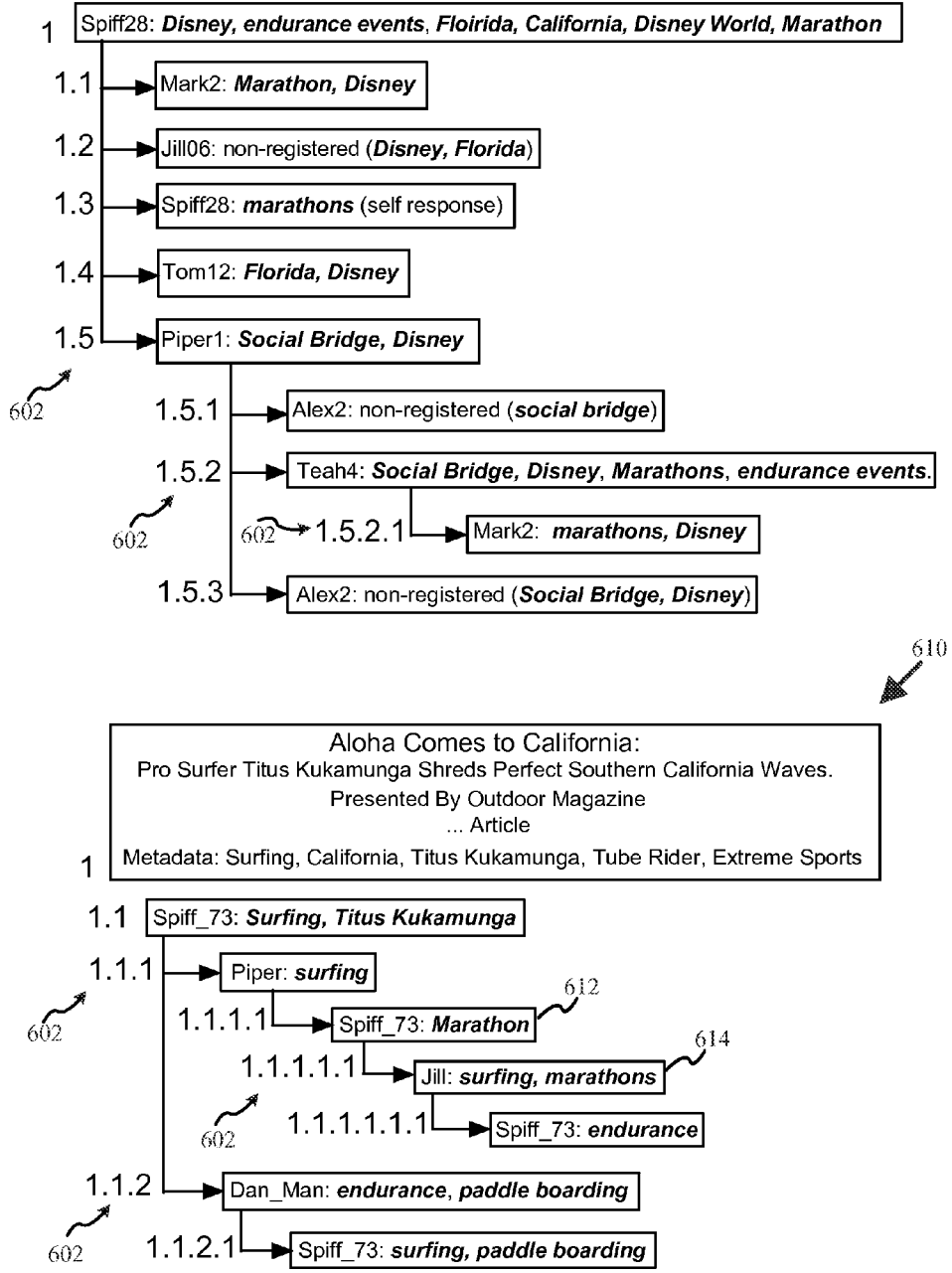
FIG. 6 illustrates outlines of the discussions in FIGS. 3 and 5 and associated Fields in accordance with at least one embodiment.

In FIG. 6, outline 600 conceptually illustrates the Response level 602 and the Fields occurring in each Response. Non-registered Users Jill06 and Alex2 have their Fields shown in brackets so as to note their presence, but also to indicate that for at least one embodiment they are not considered in determining Field Values. In FIG. 9, table of records 900 conceptually illustrates how outline 600 may be internally recorded by the database of Authentication System 100. Non-registered Users are again shown in Italics. For at least one embodiment, as shown in table of records 900, the ratings adjustment variable may be adjusted for each individual Response.

In at least one embodiment the decreasing value for indirect vs. direct subsequent Responses is assigned in accordance with a Fibonacci scale (a dissipative value scheme divided by 1, 2, 3, 5, 8 . . . ). For example the threaded discussion outlined in FIG. 6 creates a Response hierarchy for User Spiff's original Entry that can be evaluated as follows:
  4 registered User Responses at $2^{nd}$ level: Evaluation is 1/1×4=4
  1 registered User Responses at $3^{rd}$ level: Evaluation is ½×1=0.5

1 registered User Response at $4^{th}$ level: Evaluation is $\frac{1}{3} \times 1 = 0.33$
TOTAL=4.83

It may be noticed that in the tally of $2^{nd}$ level Responses that Spiff28 was also counted. As noted above, in at least one embodiment a subsequent Response by the original registered User is ignored, such that an adjusted total would appear as TOTAL=3.83.

The Authentication System 100 also accounts for adjustments made from Field Averages, and again in at least one embodiment, the subsequent posting by Spiff28 is ignored along with Responses from non-registered Users, e.g., Jill06 offering Response 306 and Alex 2 offering Responses 314 ad 320. With respect to the example of FIG. 3, the Field Average is based on the Field Disney being the Field of highest frequency –5 instances.

Disney—5/5=100%
Marathon—3/5=60%
Endurance events—1/5=20%
Florida—1/5=20%
California—0/5=0%

As expressed above, because there is no rating, the Ratings Adjustment for this example is set to 50%—a neutral percentage between 0 and 100. This percentage is to applied to the Field Value.

Each respective Field Value for the Fields set forth by Spiff28 is derived based on the adjusted TOTAL=3.83 as noted above, *Field Average, *Ratings Adjustment. More specifically:

Disney—3.83×1.00×0.50=1.915
Marathon—3.83×0.60×0.50=1.49
Endurance events—3.83×0.20×0.50=0.383
Florida—3.83×0.20×0.50=0.383
California—3.83×0×0.50=0.0

These values are further shown in the table of records 810 in FIG. 8, in column 812 corresponding to the User ID of Spiff28. As shown in FIG. 2, for at least one embodiment, Responses by registered Users are optionally processed to associate at least one Field with the responding registered User. This involves a determination of whether there are new Fields, and or whether the existing Fields are to be associated with the responding user, decision 232. Associating new Fields and/or instances of existing Fields with the responding user permits the reposing user to also develop Authentication for these Fields. Moreover, the Associated Fields and their Values derived from this Topic of discussion permits registered Users to develop their own Authentication that can be recognized and applied throughout all affiliated 3rd-party social networks with the SNB.

As shown in the table of records 810, there are entries for Field Values for Fields used by the other registered User Mark2 in column 814, Tom12 in Column 816, Piper1 in column 818 and Teah4 in column 820. As there have been no direct Responses to Mark2—Response 302, or Tom12—Response 308, the associated Field Values recorded for them are shown to be zero.

Whereas table of records 810 illustrates all Fields associated by Users that occur in connection with the Topic, table of records 830 illustrates the Fields associated with a specific User, in this case Spiff28, and the total value for each Field as generated through the specific discussion, presently identified as "Disney Marathon."

With respect to discussion 300, it is also noted that there are non-textual Responses 322, e.g. the twenty six people who indicated they "Like" Entry 302. As the non-textual Responses 322 are direct to Entry 302, in varying embodiments each Field identified in Entry 302 is increased in value by an adjustable percentage. For example, as there are eight Responses, not including Spiff28, 26/8=3.25. The initial Fields 326 of Disney, endurance events, Florida, California, and Marathon can each receive an additional 0.0325 valuation, not shown in the tables.

Figure 4:
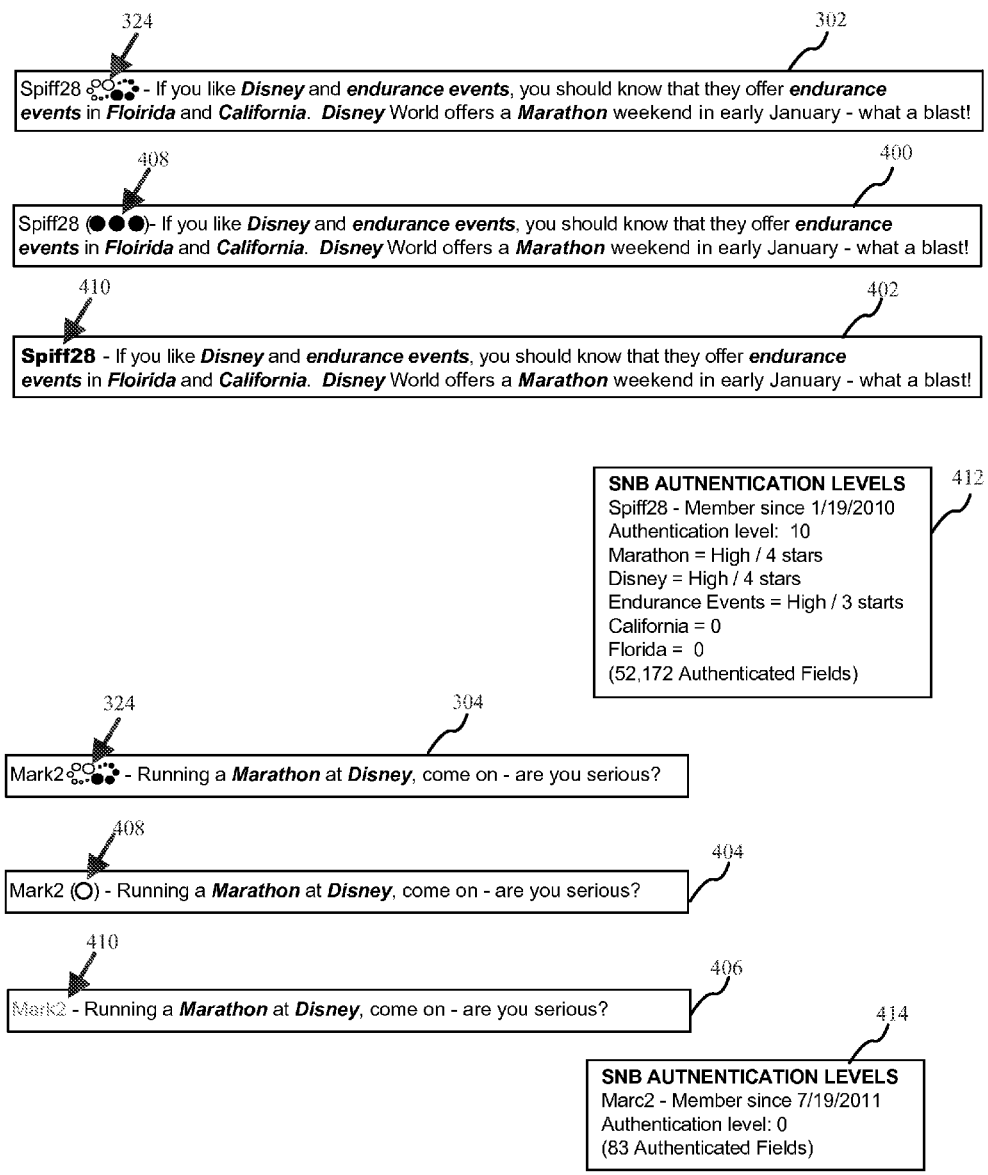
FIG. 4 illustrates variations in how Authentication and degrees of Authentication can be indicated in accordance with at least one embodiment.

As noted above, a User's participation with the Authentication System 100 may be indicated by an indicator 324, such as an icon, to other Users. FIG. 4 illustrates at least three variations for such indicators 324. More specifically, in FIG. 4 there are shown three reproductions of User Spiff28's initial Entry 302, shown as Entry 302, 400 and 402. There are also shown three reproductions of User Mark2's Response 304, shown as Response 304, 404 and 406.

In Entry 400 and Response 404 the base indicator 324 has been replaced with a value indicator 408. The value indicator 408 can be established to illustrate a value along a pre-defined scale or pre-defined range, such as from no Authentication represented by a Circle, to a high Authentication represented by three solid dots. User Mark2 has yet to establish an Authentication level (Authentication level 0) so his associated value indicator 408 is a Circle, whereas Spiff28 has established a high Authentication level (Authentication Level 10) so his associated value indicator 408 is three solid dots.

In Entry 402 and Response 406 the User name is displayed in a specific value color 410, e.g., bold black for Spiff28 and Grey for Mark2. Indicator 324 may also be provided as an audible indicator, not shown. Moreover, the type and nature of the indicator 324 may be selected from a group consisting of, but not specifically limited to, an icon, graphic, photo, luminance intensity, color, value, audio element, or other element as may be suitable for different environments and Users.

Placing a cursor over the User name or otherwise selecting a User name may in varying embodiments, provide a viewing party with a popup or other display providing greater information regarding the selected Users Authentication levels, such as is shown in pop-up 412 for Spiff28 and pop-up 414 for Mark2. Indeed, in varying embodiments the Fields reported within the pop-ups may be links permitting the viewing party to jump to other discussions involving the authenticated Fields as well as a listing of at least a subset of all authenticated Fields associated with the selected User.

For at least one embodiment, the indications of participation in Authentication System 100, as well as the indication of Authentication are provided directly by the first social network site 102. In alternative embodiments, these indications are achieved with the use of browser plugins—such as for example, but not limited to, ActiveX components. In yet still other embodiments enhanced browsers or other applications used to interact with the social network site are provided. Such plugins or enhanced applications may independently communicate with the Authentication System 100 so as to independently recognize and respond to the presence of a registered User in a currently displayed discussion.

With respect to the above discussion and described figures, the Authentication System 100 and method 200 may be appreciated for the advantageous ability to provide an indication of a Users Authentication with respect to at least a first social network. This Authentication is maintained and can be provided whenever a registered User is active upon the first social network.

Authentication Expanded to a Second Social Network

With respect to the above discussion, it is clear that Authentication of a User identity is achieved by gathering metadata from at least one discussion involving at least one pre-defined User identity on a first social network. The metadata of at least one $3^{th}$ party Response related to a posting by the pre-defined User is evaluated and based on this evaluation the pre-defined User is authenticated and an indication of the Authentication is provided.

For yet another embodiment, the Authentication System is operable across at least two social networks. More specifically, in addition to the methodology as applied to a first social network 102, for at least one embodiment the Authentication of a User identity includes gathering metadata from at least one discussion involving the pre-defined User identity on a second social network 112. The metadata of at least one $3^{rd}$ party Response related to a posting by the pre-defined User on the second social network 112 is evaluated. The pre-defined User is authenticated based on the evaluations occurring on both the first social network 102 and the second social network 112, and an indication of the Authentication is provided to both first social network 102 and the second social network 112.

Moreover, it should be further understood and appreciated that in at least one embodiment, the User's Authentication is entirely portable to other social networks where he or she is a member, whether identified by the same User Identity or another User Identity that is associated to him or her as a registered User of the Authentication System 100. As noted above, where Authentication is implemented for a plurality of social networks, the Authentication System 100 may be aptly identified as a social network bridge, as it is providing a bridge to port Authentication from one arena to another.

Variations of the methodology for implementation are of course possible for different embodiments, and indeed implementation of method 200 upon different social networks may be different as well. Moreover, for one social network all User Responses may be considered whereas for a different social network only Responses by registered Users are considered. One social network may have one or more ratings systems and another social network may offer none. Further, for one social network the Authentication System may provide an indicator that is ever present, such as is shown in FIG. 3, whereas for another social network, the indicator may be evident upon User selection, or as a sub-window. Indeed, even where the methodology is the same, differences in how social network sites are presented may result in different visual presentation of how a User's Authentication is presented. See FIG. 12 as it provides a description of how a graphical user interface can be used to recognize User Authentication.

Figure 5:
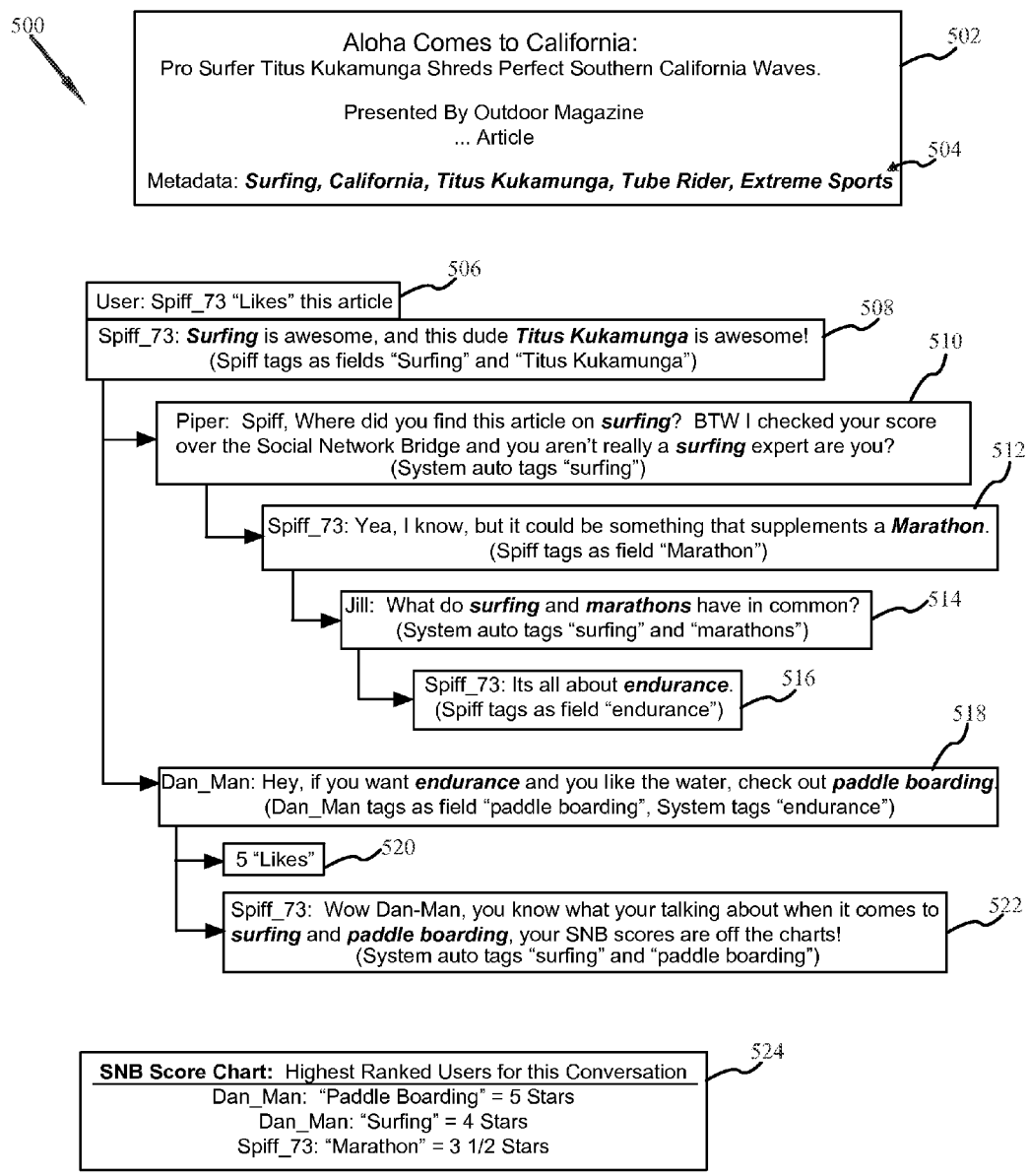
FIG. 5 is a conceptual illustration of a discussion on a second social network and at least one known user identity participating in the authentication process in accordance with at least one embodiment.

FIG. 5 illustrates a conceptual method of implementation for a second social network 112 that is distinct from the first social network 102 and discussion shown in FIG. 3. Again it will be appreciated that this description is merely exemplary of at least one method of implementing the Authentication System 100 with respect to at least one second social network 112.

The Authentication System 100 is flexible enough to function on a variety of Social Networks, or more specifically, a Community Platform comprised of the following elements, one or more recognizable Users, an ability to form Entries and Responses in order to form a threaded discussion around a specific Topic. Even the ability to "suggest", "like", "thumbs up/down", can be viewed as an entry and a part of a threaded discussion.

It is to be appreciated that absent the advantageous nature of the Authentication System 100, actions by Users on the first social network 102 exampled by FIG. 3 would be unknown to User on the second social network 112 exampled by FIG. 5—and vis-a-versa.

Returning to FIG. 7, table of records 716 provides the User names 718 associated with registered User Dan Mann and at least two social network sites. As with table of records 710 associated to User Spiff, table of records 720 illustrates the Fields associated with User Dan Mann, and specifically with the discussion 500 as illustrated in FIG. 5.

With respect to FIG. 5 it is to be understood and appreciated that discussion 500 is occurring in response to an article 502 that has been posted. It is further understood and appreciated that for purposes of the present example it is assumed that article 502 has been posted by the User Spiff_73—though it is further understood and appreciated that User Spiff_73 need not be the original author. In other words the media giving rise to the discussion 500 is understood and appreciated to be of varying forms and origins. Moreover, article 502 may be a blog, new article, or other writing that has been offered in the online community. With respect to the Authentication System 100, and method 200 this article 502 is received and treated as an initial Entry to a thread, and more specifically the Topic. As shown, metadata Fields 504 of Surfing, California, Titus Kukamunga, Tube Rider and Extreme Sports have been shown in Bold Italics.

For the present example it is assumed that Users are included in the Authentication System 100 regardless of registration. It is also assumed that User Spiff_73 has posted the article 502, but also that Spiff_73 is not the author of the article 502. As with the discussion shown in FIG. 3, it is of course understood and appreciated that the discussion in FIG. 5 is generally understood to occur over time, but has been illustrated as substantially complete for ease of illustration and discussion.

There are also nine (9) subsequent Responses, 506, 508, 510, 512, 514, 516, 518, 520 and 522 of which Responses 506 and 520 are non-textual Responses and 508, 510, 512, 514, 516, 518 and 520 are textual. In the textual Responses 508, 510, 512, 514, 516, 518 and 520 some words are again shown in Bold Italics to indicate they are Fields 504. In addition, shown within brackets for each Response is an indication of how the Fields 504 have been identified—e.g., by the User posting the Response, or by the Authentication System 100 recognizing the use of a previously identified Field 504.

Discussion 500 is monitored by the Authentication System 100 in substantially the same way as described above with respect to discussion 300. At block 206 the Authentication System 100 is monitoring the second social network 112 for an Entry/Response.

In response to the posting of the article and initial comments by Spiff_73, (activity by a Registered User, decision 208), the Authentication System 100 instantiates a new table of records 1000 shown in FIG. 10, by following the method as described above with respect to blocks 220, 222 and 224. Similar to FIG. 8, in FIG. 10, table of records 1000 conceptually illustrate a database entry for the new discussion Topic as initiated by Spiff_73, showing the topic name, source, date and whether or not a ratings adjustment is to be applied. Gathered metadata, block 222, is also correlated in the topic hierarchy 258, further shown as table of records 1100 in FIG. 11.

For the purposes of this example, it is presumed that Spiff_73 has identified directly or with the aid of the Authentication System 100 the Fields 504 of Surfing, California, Titus Kukamunga, Tube Rider and Extreme Sports, such that these Fields are associated with the Authentication System 100 User Spiff as records 714 as shown in table of records 710 as described above.

For the second social network 112 and discussion 500, the Users Authentication level is indicated in a different form from that illustrated with respect to the first social network 102 and discussion 300. In FIG. 5, presented is an active area identified as the SNB Score Chart 524. The SNB Score Chart 524 shows the aggregate Field Value derived from the Users Accounts that relate to the current Topic.

Upon the initial Entry of the Topic 502 and the Responses 506 and 508 by Spiff_73, the SNB Score Chart 524 would contain no listing of Users or aggregate Field Values as the only User at that point would be Spiff_73, and Authentication within this thread is only established by third party Responses.

From the above discussion with respect to the discussion 300 shown in FIG. 3, it is understood and appreciated that Spiff Jones, aka, Spiff28 for the first social network 102 and here Spiff_73 for the second social network 112 has previously established a level of Authentication with respect to quite a number of different Fields. However, Authentication for one specific Field does not necessarily imply Authentication for another Field.

Moreover, as the Authentication System continues to monitor the second social network, block 206, it will detect the activity by Piper, decision 208, and as a Response, metadata will be gathered, block 214, and for associated Field(s) values will be determined and Authentication levels will be adjusted, blocks 226 and 228.

As the Response 510 by Piper indicates, the Authentication System 100 has permitted her to ascertain that Spiff_73 has little, if any Authentication with respect to the Field surfing. In his Response 512, Spiff_73 openly admits this, but now also introduces the Field Marathon, a Field for which he does indeed have Authentication, and thereby may bolster his credibility.

The SNB Score Chart 524 now updates the listing of Authenticated Users to show that indeed Spiff_73 is Authenticated for the Field Marathon, and shows his level of Authentication. Piper, apparently having no Authentication for the Fields Marathon or Surfing is not displayed in the SNB Score Chart 524.

Once the discussion 500 reaches the Response 518 by registered User Dan_Man06, the Authentication System 100 recognizes the Field paddle boarding. As this is his first Response to discussion 500 he is only now added to the SNB Score Chart 524. However, because Dan_Man06 has a previously established Authentication with respect to the Field Surfing, his Authentication for that Field as a component of the current discussion 500 is also displayed along with his Authentication for paddle boarding in the SNB Score Chart 524. Also, as his Authentication levels are greater than what Spiff_72 has established with respect to the Field Marathon, Dan_Man06 is shown first in the listing.

Whereas discussion 300 evolved with multiple Responses occurring at the same level, discussion 500 illustrates that most of the Responses are indeed Responses to Responses. This provides an alternative view for how Field Values can be applied to the Associations that are made at each nested level of the hierarchical discussion through subsequent Response to those levels. Outline 610 in FIG. 6 conceptually illustrates the Response levels 602 and Fields 504 that are occurring in each Response. Table of records 1100 conceptually illustrates how the Authentication System 100 may record this hierarchy as well.

As with the discussion 300 and table of records 810, the Authentication System 100 establishes a table of records 1010 to associate each User with respective Fields 504 in discussion 500, and the associated Field values.

More specifically, in accordance with the example of discussion 300 in FIG. 3, the Response hierarchy for User Spiff's original Entry is evaluated as follows:

2 registered User Responses at the $2^{rd}$ level: Evaluation is
$1/1 \times 2 = 2$
2 registered User Responses at the $3^{rd}$ level: Evaluation is
$1/2 \times 2 = 1$
1 registered User Response at the $4^{th}$ level: Evaluation is
$1/3 \times 1 = 0.33$
1 registered User Response at the $5^{th}$ level: Evaluation is
$1/4 \times 1 = 0.25$
TOTAL=3.58

It may be noticed that in the tally Spiff_73 was counted for both of the $3^{rd}$ level Responses and for the one $5^{th}$ level Response. As noted above, in at least one embodiment a subsequent Response by the original registered User is ignored, such that an adjusted Total would appear as TOTAL=2.33

Accounting again for adjustments made from the Field Averages, and again ignoring the subsequent postings by Spiff_78, the Field Average is based on the Field surfing being the Field of highest frequency 2 instances other than those by Spiff_73. This Field Average relates to all subsequent Responses to Spiff's original Entry.

Surfing—2/2=100%
Paddle boarding—½=50%
Endurance—½=50%
Marathon—½=50%
Titus Kukamunga—0/2=0%
Tube rider—0/2=0%
Extreme Sports—0/2=0%
California—0/2=0%

Each respective Field Value for the Fields set forth by Spiff_73's original entry is derived based on the adjusted TOTAL=2.33 as noted above, *Field Average, *Ratings Adjustment. More specifically:

Surfing—2.33×1.00×0.50=1.165
Titus Kukamunga—2.33×0×0.50=0

It should also be noted that with respect to discussion 500 Spiff_73's creates a subsequent entry 612, FIG. 6, that creates an Association to the Field Marathon. From this level of the hierarchy Marathon is used one more time by User Jill along with Surfing, while subsequently Spiff_73 makes reference to the Field endurance. From this level of the Hierarchy the Field Average for Marathon is 100% since Marathon, surfing, and endurance are all subsequently used once, or a ratio of 1/1. Since this Entry/Response generated one 1st level Response from User Jill (e.g., Response 614), and a 2nd level Response from Spiff_73 which is nullified, the Field Value Spiff_73 generates for Marathon from this Entry/Response is 1.0×1.00×0.50=0.50. Since there are no Responses to Spiff_73's other two Responses, Spiff_73 generates no values to the Fields Associated within those Responses.

With respect to discussion 500, it is also noted that there are 5 "Likes" in Response to Response 518 by User Dan_Man. These are simple, non-textual Responses that provide no additional information beyond the indicated preference, e.g., like or dislike, thumbs up or thumbs down, happy face or sad face, etc. . . . , and perhaps the User's ID. In discussion 300 there were also non-textual Responses, but they were direct to the initial Entry 302. Because Responses to Responses are indirect Responses, they are evaluated differently.

When the Authentication System 100 is configured for affiliation with at least one social network, settings for the type of non-textual Responses that may be present are entered as well. Of course an administrator or other authorized party can adjust the configuration settings of the Authentication System 100 at a later time so as to accommodate changes that may occur both with registered Users as well as affiliated social networks.

With respect to the discussion 500, once the non-textual Responses 520 occur, the Authentication System 100 acts to recognize them and evaluate them for proper Authentication adjustment of the related Fields 504 in the parent Response 518, in this case paddle boarding and endurance.

For User Dan_Man's Response 518 Associations to the Fields endurance and paddle boarding are created. Since this generates the Responses "5 Likes", and a 1st level Response from Spiff_73 the following Field Averages and Field Values are created. For this embodiment, the predetermined value of 0.20 is set for each non-textual Response "Like". As such, the 5 "Likes" generate a value of 1.0. The $1^{st}$ level Response from Sipff_73 coincidently also generates a value of 1. The non-textual Responses (5 Likes) and the Response from Spiff_73 are then combined for a base value Total=2. Therefore, from this Entry/Response User Dan_Man generates a Field Value of 2×1.0 (Field Average)×0.5 (Ratings Adjustment)=1, for the Field paddle boarding, and Field Value of 2×0 (Field Average)×0.5 (Ratings Adjustment)=0 for the Field endurance.

These values are combined with the Field Values as determined above and shown in the table of records 1010 in FIG. 10, in column 1012 corresponding to the User ID of Spiff_73. As with the table of records 810, table of records 1010 tracks the use of each Field corresponding with each registered User. Moreover, there are entries for Field Values for the Fields used by other registered User Piper in column 1014, Jill in Column 1016, and Dan_Man in column 1018.

Whereas table of records 1010 illustrates all Fields associated by Users that occur in connection with the Topic of discussion 500 table of records 1030 illustrates the Total Field Value that is derived from the Topic "Aloha Comes to California." This table is derived from all Associations to Fields, and all Field Values that where generated through this Topic. This allows for an additional benefit of the SNB, in which threaded discussions can be Authenticated based upon the Fields and their Values that are generated through discussions. It is further appreciated that the Authentication System 100 has information establishing the fact that Spiff_73 and Spiff28 are one and the same User and as such, his Authentication as developed/augmented on the one social network is portable to another social network and vis-a-versa.

To summarize, for at least one embodiment, the Authentication System 100 is operable to authenticate User identities between a plurality of social networks. Such operation is achieved by implementing a method of associating metadata from a posting by a pre-defined User identity on a first social network to define at least one associated Field. The method continues by tracking Responses to the posting by at least one third party, and in Response to the third party using the at least one associated Field, assigning a value to the associated Field used. The pre-defined User is then authenticated based on the value of at least one associated Field. An indication of the pre-defined Users Authentication is then provided on the first social network and any second social networks wherein the pre-defined User is engaged in discussion involving the at least one associated Field.

Authentication in an Existing Discussion

Figure 12:
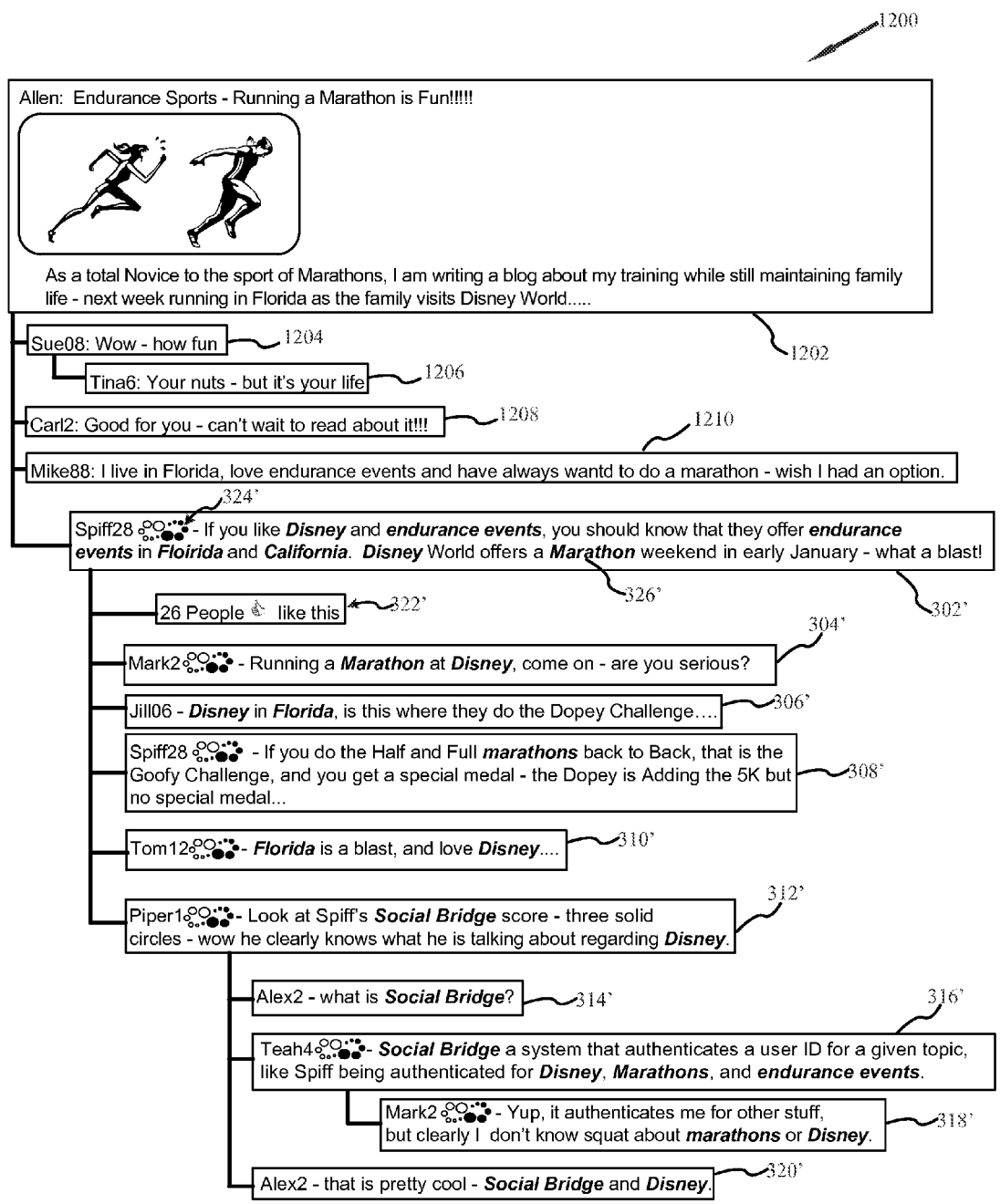
FIG. 12 is a conceptual illustration of a discussion wherein the first instance of a Registered User is as a responding party in accordance with at least one embodiment.
Figure 13:
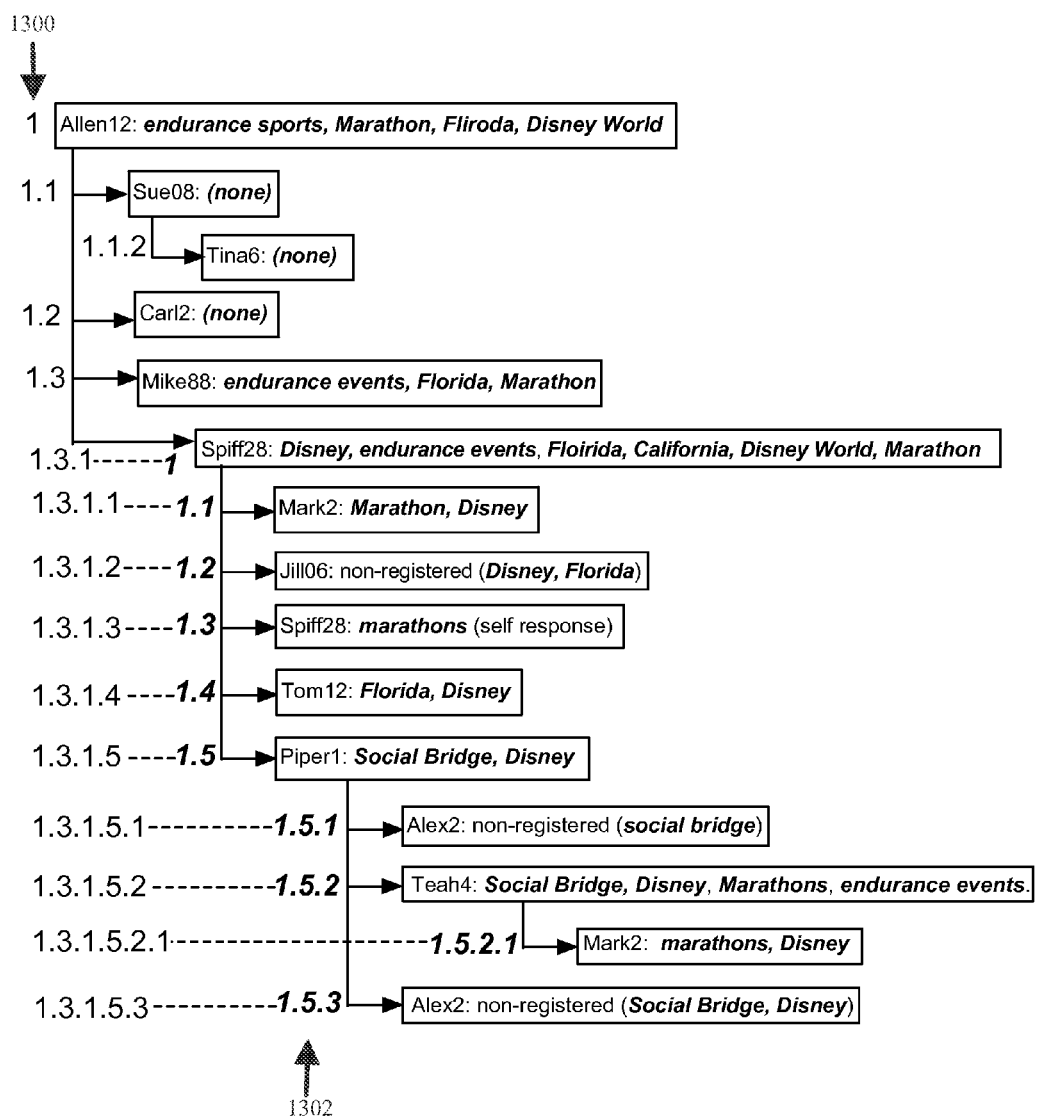
FIG. 13 illustrates an outline of the Response hierarchy for the discussion in FIG. 12 in accordance with at least one embodiment.

As noted above, the Authentication System 100 and method 200 are responsive to Authenticate a User in Response to subsequent postings by one or more $3^{rd}$ parties. With respect to both of the above example discussion 300 and 500, the initial posting and Topic have been established by a registered User initiating the entire discussion. FIGS. 12 and 13 illustrate how Authentication is still achieved for registered Users when the registered Users are not the originating parties.

More specifically, FIG. 12 presents discussion 1200 which is recognized to closely parallel discussion 300 above as Responses 302', 304', 306', 308', 310', 312', 314', 316', 318,' 320' and 322' are substantially identical to Entry 302 and Responses 304, 306, 308, 310, 312, 314, 316, 318, 320 and 322 as described above. The difference of course is that Responses 302'~322' are occurring in Response to prior postings by other users who are not registered Users known to the Authentication System 100.

Discussion 1200 has been initiated by the posting of a video by User Allen12, who further adds commentary about an ongoing blog. As shown, there are also four Responses 1204, 1206, 1208 and 1210 by other Users which occur before Response 302' by Spiff28 is shown to occur. However, the original Entry 1202 and Responses 1204, 1206, 1208 and 1210 were provided by un-registered Users, Authentication System 100 and method 200 as described above have not been triggered.

Upon the action of Spiff28 to offer Response 302' the Authentication System 100 and method 200 commence with the Authentication process as Spiff28 is indeed a registered User. With respect to this example discussion 1200, for at least one embodiment the metadata from the original entry 1202 should reviewed as the Topic is generally understood to be set by the initial entry, and in this case would appear to be "Endurance Sports—Running a Marathon is Fun." Spiff28 may in certain embodiments amend this Topic or add an addendum to the Topic as "Disney Marathons."

With respect to FIG. 12 and the initial Entry 1200, the terms "Endurance Sports—Running a Marathon is Fun," "Florida," and "Disney World" are not shown in Bold Italics as was done in FIGS. 3 and 6 to indicate Fields. This is because at the time of the posting by Allen, an un-registered User, they were not recognized to the Authentication System 100 and method 200 as Fields. Moreover, they may become Fields upon the posting of Response 302' by Spiff28 who is a registered User.

In addition, as is shown in FIG. 13, paralleling FIG. 6 the hierarchy 1300 of discussion 1200 is slightly different as the Reponses by Spiff28 is not a first level Response. The Fields endurance sports and Marathon define the Topic as the first node in the hierarchy. However, as the Response by Spiff28 is the first instance of a Response by a registered User, the intervening Responses and even the original Entry by Allen12 are discounted as they do not affect the Authentication as it transpires for Spiff28 and the subsequent other registered Users.

Moreover, for at least one embodiment the hierarchy 1300 is relative with respect to the perspective of User Spiff28, and thus shown in bold italics as hierarchy 1302. As Spiff28 cannot receive Authentication from his own Response, his Response may be equated to a $1^{st}$ level Response, though it does not replace the Topic as recorded in the Topic Hierarchy. In the event that Allen12, Sue08, Tina6, Car12, or Mike 88 should become registered Users, the designation of the Topic will still remain as the first node in the hierarchy.

Figure 14:
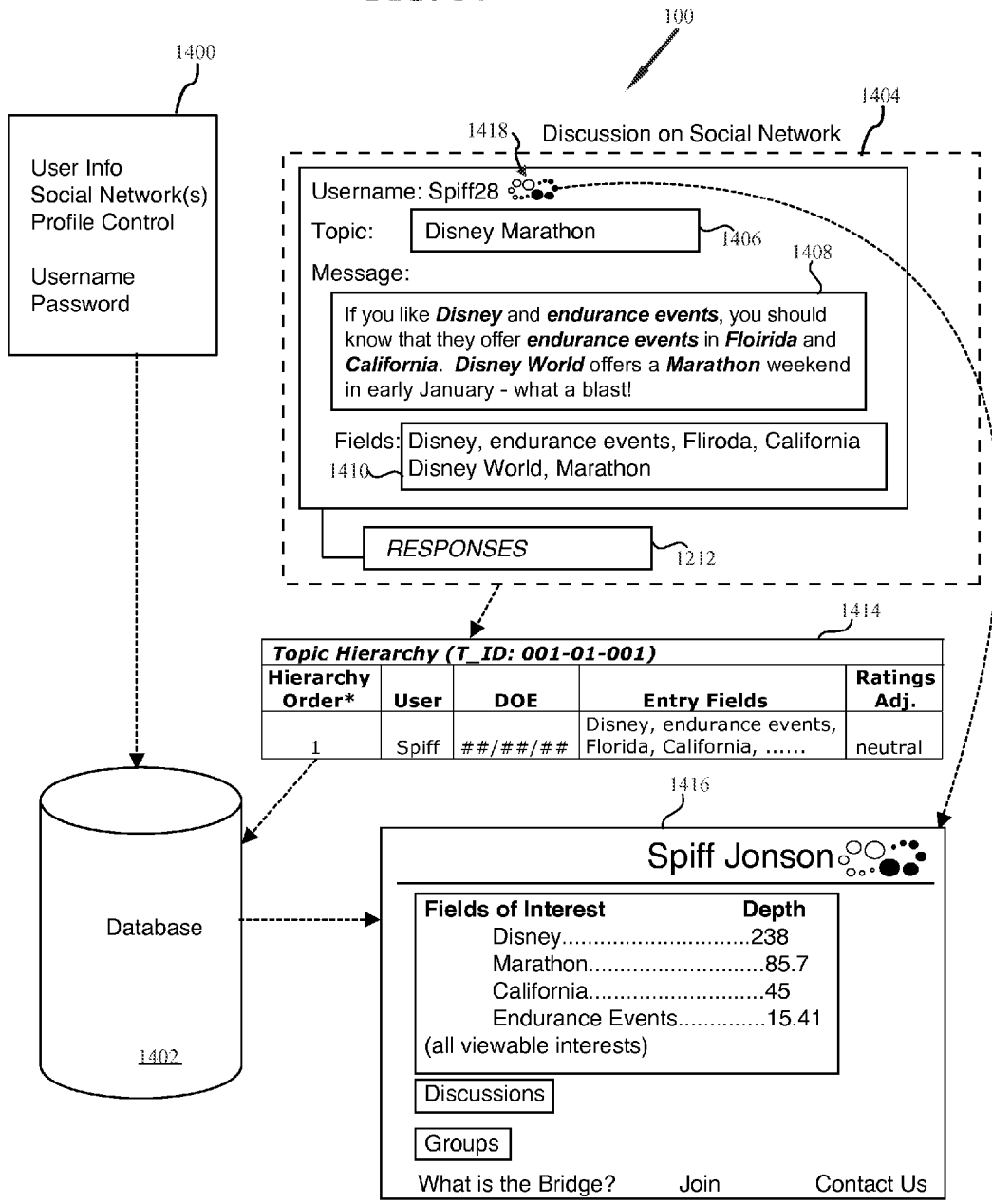
FIG. 14 illustrates a conceptual view of the Authentication System in operation in accordance with at least one embodiment.

In summary of the above descriptions, FIG. 14 presents a conceptual view of the Authentication System 100 in operation. Basic information 1400 regarding the registered User's information (User IDs, social networks, etc.) are provided to the database 1402 of the Authentication System 100.

As a discussion 1404 evolves on at least one social network, the involvement of a registered User, such as the exemplary Spiff28, triggers the Authentication System 100 to collect metadata. For the initial posting, this metadata may well include a Topic 1406 as well as metadata from the textual posting 1408, including but not limited to, at least one Field 1410.

Responses 1412 by $3^{rd}$ parties, are trapped by the Authentication System and based on the metadata gathered from those Responses the Users Authentication is established, and/ or augmented. The Authentication System 100 maintains record 1414 of the Topic and the evolving discussion 1404. A varying degree of information 1416 regarding a registered User can be provided.

For example, registered User Spiff28 is shown to have an indicator icon 1418 demonstrating his participation in the Authentication System 100. In varying embodiments, a click, cursor over, or other selection operation can provide a window to display information 1416.

It should also be understood and appreciated that as the method 200 of Authentication bridges the registered Users identity across multiple social networks, it is advantageously possible for an inquisitive party to learn of other discussions and or information upon other social networks that he or she may have been previously unaware of. For example, a person looking for information in caring for an elderly parent may discover a social network and support group that is entirely dedicated to that cause. Likewise, a universe of valuable information regarding nut allergies, ideas for safe birthday ideas for children, or other issues may be easily identified and accessed in ways that are not currently provided by traditional search engines.

Figure 15:
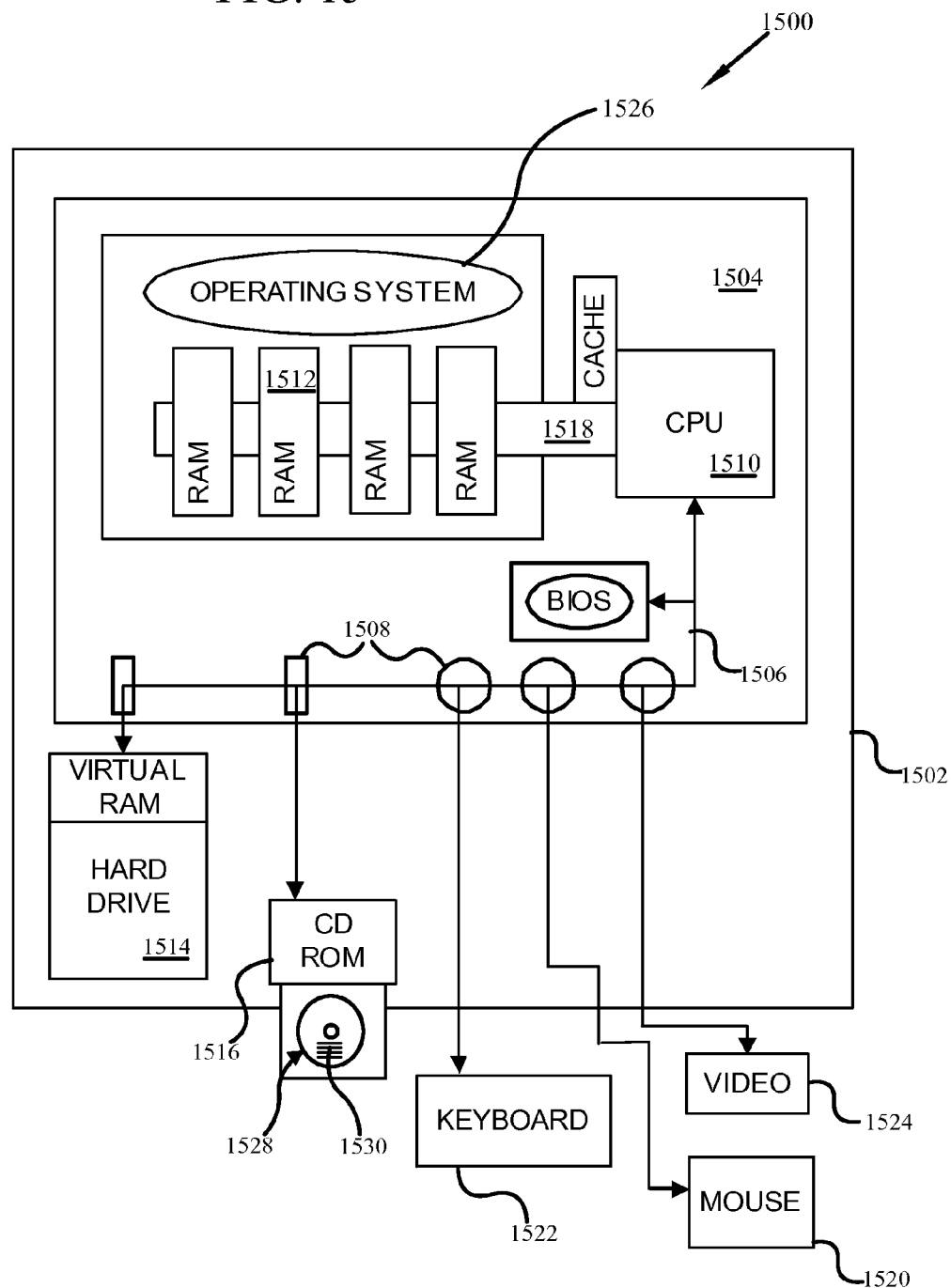
FIG. 15 is a block diagram of a computer system in accordance with certain embodiments of the present invention

With respect to the above description of Authentication System 100 and method 200 it is understood and appreciated that the method may be rendered in a variety of different forms of code and instruction as may be used for different computer systems and environments. To expand upon the initial suggestion of a computer implementation above, FIG. 15 is a high level block diagram of an exemplary computer system 1500. Computer system 1500 has a case 1502, enclosing a main board 1504. The main board 1504 has a system bus 1506, connection ports 1508, a processing unit, such as Central Processing Unit (CPU) 1510 with at least one macroprocessor (not shown) and a memory storage device, such as main memory 1512, hard drive 1514 and CD/DVD ROM drive 1516.

Memory bus 1518 couples main memory 1512 to the CPU 1510. A system bus 1506 couples the hard disc drive 1514, CD/DVD ROM drive 1516 and connection ports 1508 to the CPU 1510. Multiple input devices may be provided, such as, for example, a mouse 1520 and keyboard 1522. Multiple output devices may also be provided, such as, for example, a video monitor 1524 and a printer (not shown).

Computer system 1500 may be a commercially available system, such as a desktop workstation unit provided by IBM, Dell Computers, Gateway, Apple, or other computer system provider. Computer system 1500 may also be a networked computer system, wherein memory storage components such as hard drive 1514, additional CPUs 1510 and output devices such as printers are provided by physically separate computer systems commonly connected together in the network. Those skilled in the art will understand and appreciate that the physical composition of components and component interconnections are comprised by the computer system 1500, and select a computer system 1500 suitable for the establishing the Authentication System 100.

When computer system 1500 is activated, preferably an operating system 1526 will load into main memory 1512 as part of the boot strap startup sequence and ready the computer system 1500 for operation. At the simplest level, and in the most general sense, the tasks of an operating system fall into specific categories, such as, process management, device management (including application and User interface management) and memory management, for example. The form of the computer-readable medium 1528 and language of the program 1530 are understood to be appropriate for and functionally cooperate with the computer system 1500.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:

1. A non-subjective method to authenticate user identities comprising:
   gathering metadata from at least one discussion involving at least one pre-defined user identity on a first social network to define at least one associated text field provided by the at least one pre-defined user and occurring in the discussion;
   defining a system generated value to be assigned to each associated text field upon subsequent use in a response by a third party, the system generated value to be applied defined without influence from the third party;
   evaluating the metadata of at least one third party response related to a posting by the at least one predefined user identity, and in response to the third party using one or more of the associated text fields in the response, assigning the system generated value to each associated text field used in the response, and in the case of multiple evaluated third party responses, for each subsequently used associated text field aggregating the assigned values; and
   authenticating the at least one pre-defined user identity as a degree of credibility regarding the at least one pre-defined user identity's association to at least one associated text field occurring in the discussion based on the value of the associated text field as developed by the subsequent use of the associated text field in the one or more evaluated third party responses; and
   providing an indication of authentication for the at least one pre-defined user identity.

2. The method of claim 1, wherein evaluating metadata of at least one third party response includes non-textual responses.

3. The method of claim 1, wherein all third party responses are evaluated.

4. The method of claim 1, further including at least a first system generated value to be assigned to each associated text field upon subsequent use in a direct response by a third party and at least a second system generated value to be assigned to each associated text field upon subsequent use in an indirect response by a third party, the first system generated value being greater than the second system generated value.

5. The method of claim 1, further comprising:
   gathering metadata from at least one discussion involving the at least one pre-defined user identity on a second social network to define at least one associated text field provided by the at least one pre-defined user identity and occurring in the discussion on the second social network;
   evaluating the metadata of at least one third party response related to a posting by the at least one predefined user identity on the second social network, and in response to the third party using one or more of the associated text fields in the response, assigning the system generated value to each associated text field used in the response, and in the case of multiple evaluated third party responses, for each subsequently used associated text field aggregating the assigned values; and authenticating the at least one pre-defined user identity as a degree of credibility regarding the at least one pre-defined user identity's association to at least one associated text field occurring in the discussion on the second social network based on the value of the associated text field as developed by the subsequent use of the associated text field in the one or more evaluated third party responses; and providing an indication of the at least one pre-defined user's authentication to the first social network and the second social network.

6. The method of claim 1, wherein a plurality of associated text fields are defined for the at least one predefined user identity.

7. The method of claim 1, wherein the method bridges the at least one pre-defined user identity authentication across a plurality of social networks.

8. The method of claim 1, wherein authenticating the pre-defined user identity includes providing a degree of authentication across a pre-defined range.

9. The method of claim 1, wherein at least one third party providing a response has a user identity that has been authenticated.

10. The method of claim 1, wherein the indication is provided in the form selected from the group consisting of an icon, graphic, picture, color, luminance intensity, value, and audible element.

11. A method to authenticate user identities on at least one social network comprising:
    associating metadata from a posting by a first user identity on a first social network to define at least one associated text field occurring in the posting;
    defining a system generated value to be assigned to each associated text field upon subsequent use in a response by a third party, the system generated value to be applied defined without influence from the third party;
    tracking responses to the posting by at least one third party, and for each response in response to the third party using one or more of the associated text fields in the response, assigning the system generated value to each associated text field used in the response to develop an aggregate assigned value for each associated text field;
    authenticating the first user identity as a degree of credibility regarding the at least one pre-defined user identity's association to at least one associated text field based on the value of one or more of the associated text fields as developed by the subsequent use of one or more of the associated text fields by third parties; and
    providing an indication of the first user authentication.

12. The method of claim 11, further including tracking at least one non-textual response to postings by at least one third party and authenticating the first user identity based at least in part on the at least one non-textual response.

13. The method of claim 12, wherein the non-textual response is selected from the group consisting of a rating scale, like/dislike, and thumbs-up thumbs-down.

14. The method of claim 11, wherein an indication of the first user identity authentication is provided to at least one second social network where the first user identity is engaged in discussion involving the at least one associated text field.

15. The method of claim 11, further comprising:
    gathering metadata from at least one discussion involving the first user identity on a second social network to define at least one associated text field provided by the first user identity and occurring in the discussion on the second social network;
    evaluating the metadata of at least one third party response related to a posting by the first user identity on the second social network, and in response to the third party using one or more of the associated text fields in the response, assigning the system generated value to each associated text field used in the response, and in the case of multiple evaluated third party responses, for each subsequently used associated text field aggregating the assigned values; and
    authenticating the first user identity as a degree of credibility regarding the first user identity's association to at least one associated text field occurring in the discussion on the second social network based on the value of the associated text field as developed by the subsequent use of the associated text field in the one or more evaluated third party responses; and
    providing an indication of the first user identity authentication to the first social network and the second social network.

16. The method of claim 11, further including at least a first system generated value to be assigned to each associated text field upon subsequent use in a direct response by a third party and at least a second system generated value to be assigned to each associated text field upon subsequent use in an indirect response by a third party, the first system generated value being greater than the second system generated value.

17. The method of claim 11, wherein the method bridges the first user authentication across a plurality of social networks.

18. The method of claim 11, wherein the authenticating process is based at least in part on determining the number of responses by third parties, the number of times the at least one associated text field is used in responses, and non-textual third party responses.

19. The method of claim 11, wherein the indication is provided in the form selected from the group consisting of an icon, graphic, picture, color, luminance intensity, value, and audible element.

20. A computer system having at least one physical processor and memory adapted by software instructions for authenticating user identities comprising:
    at least one user account in the memory, the user account identifying at least a first social network and an associated known user identity;
    the processor adapted at least in part by the software as a metadata gatherer structured and arranged to gather metadata from at least the first social network regarding each known user identity, the gathered metadata including at least one text field obtained from at least one posting by a known user identity and subsequent third party responses to the known user identity, the responses including the at least one text field;
    a database in the memory structured and arranged to associate the at least one text field to the known user identity as an associated text field; and
    the processor adapted at least in part by the software as an authenticator structured and arranged to authenticate each known user identity as a degree of credibility regarding each known user identity's association to at least one associated text field by evaluating the metadata of at least one third party response related to a posting by each known user identity, and in response to the third party using one or more of the associated text fields in the response, assigning a system generated value to each associated text field used in the response, and in the case of multiple evaluated third party responses, for each subsequently used associated text field aggregating the assigned values, the system generated value to be applied defined without influence from the third party.

21. The computer system of claim 20, wherein the authenticator is further structured and arranged to assign a first system generated value to each associated text field upon subsequent use in a direct response by a third party and assign at least a second system generated value to each associated text field upon subsequent use in an indirect response by a third party, the first system generated value being greater than the second system generated value.

22. The computer system of claim 20, wherein a plurality of associated text fields are defined for each known user identity.

23. The computer system of claim 20, wherein the system for authentication is a component of the first social network.

24. The computer system of claim 20, wherein the system for authentication is distinct from the first social network.

25. The computer system of claim 20, wherein the authenticator is further structured and arranged to assign a first value to direct responses and second value to indirect responses, the second value being less then the first value.

26. The computer system of claim 20, wherein the metadata gatherer further gathers metadata from non-textual responses by third parties.

27. The computer system of claim 20, wherein at least one user account identifies at least a second social network and a second associated known user identity.

28. The computer system of claim 20, wherein a third party response on the second social network site involving the at least one text field associated to the known user affects the authentication of the known user on both the first and second social network sites.

29. The computer system of claim 20, wherein the system is structured and arranged to provide an indication of authentication, the indication is provided in the form selected from the group consisting of an icon, graphic, picture, color, luminance intensity, value, and audible element.

30. A non-transitory machine readable medium on which is stored a computer program for authenticating a user, the computer program comprising instructions which when executed by a computer system having at least one processor performs the steps of:
    gathering metadata from at least one discussion involving at least one pre-defined user identity on a first social network to define at least one associated text field provided by the at least one pre-defined user and occurring in the discussion;
    defining a system generated value to be assigned to each associated text field upon subsequent use in a response by a third party, the system generated value to be applied defined without influence from the third party;
    evaluating the metadata of at least one third party response related to a posting by the at least one predefined user identity, and in response to the third party using one or more of the associated text fields in the response, assigning the system generated value to each associated text field used in the response, and in the case of multiple evaluated third party responses, for each subsequently used associated text field aggregating the assigned values; and
    authenticating the at least one pre-defined user identity as a degree of credibility regarding the at least one pre-defined user identity's association to at least one associated text field occurring in the discussion based on the value of the associated text field as developed by the subsequent use of the associated text field in the one or more evaluated third party responses, and providing an indication of authentication for the at least one pre-defined user identity.

31. The non-transitory machine readable medium of claim 30, further comprising computer program instructions to perform the steps of:
    gathering metadata from at least one discussion involving the at least one pre-defined user identity on a second social network to define at least one associated text field provided by the at least one pre-defined user identity and occurring in the discussion on the second social network;
    evaluating the metadata of at least one third party response related to a posting by the at least one predefined user identity on the second social network, and in response to the third party using one or more of the associated text fields in the response, assigning the system generated value to each associated text field used in the response, and in the case of multiple evaluated third party responses, for each subsequently used associated text field aggregating the assigned values; and
    authenticating the at least one pre-defined user identity as a degree of credibility regarding the at least one pre-defined user identity's association to at least one associated text field occurring in the discussion on the second social network based on the value of the associated text field as developed by the subsequent use of the associated text field in the one or more evaluated third party responses; and
    providing an indication of the at least one pre-defined user's authentication to the first social network and the second social network.

32. The non-transitory machine readable medium of claim 30, further including at least a first system generated value to be assigned to each associated text field upon subsequent use in a direct response by a third party and at least a second system generated value to be assigned to each associated text field upon subsequent use in an indirect response by a third party, the first system generated value being greater than the second system generated value.

33. The non-transitory machine readable medium of claim 30, wherein a plurality of associated text fields are defined for the at least one predefined user identity.

34. A non-transitory machine readable medium on which is stored a computer program for authenticating a user, the computer program comprising instructions which when executed by a computer system having at least one processor performs the steps of:
    associating metadata from a posting by a first user identity on a first social network to define at least one associated text field occurring in the posting;
    defining a system generated value to be assigned to each associated text field upon subsequent use in a response by a third party, the system generated value to be applied defined without influence from the third party;
    tracking responses to the posting by at least one third party, and for each response in response to the third party using one or more of the associated text fields in the response, assigning the system generated value to each associated text field used in the response to develop an aggregate assigned value for each associated text field;
    authenticating the first user identity as a degree of credibility regarding the at least one pre-defined user identity's association to at least one associated text field based on the value of one or more of the associated text fields as developed by the subsequent use of one or more of the associated text fields by third parties; and
    providing an indication of the first user authentication.

35. The non-transitory machine readable medium of claim 34, further comprising:
- gathering metadata from at least one discussion involving the first user identity on a second social network to define at least one associated text field provided by the first user identity and occurring in the discussion on the second social network;
- evaluating the metadata of at least one third party response related to a posting by the first user identity on the second social network, and in response to the third party using one or more of the associated text fields in the response, assigning the system generated value to each associated text field used in the response, and in the case of multiple evaluated third party responses, for each subsequently used associated text field aggregating the assigned values; and
- authenticating the first user identity as a degree of credibility regarding the first user identity's association to at least one associated text field occurring in the discussion on the second social network based on the value of the associated text field as developed by the subsequent use of the associated text field in the one or more evaluated third party responses; and
- providing an indication of the first user identity authentication to the first social network and the second social network.

36. The non-transitory machine readable medium of claim 34, further including at least a first system generated value to be assigned to each associated text field upon subsequent use in a direct response by a third party and at least a second system generated value to be assigned to each associated text field upon subsequent use in an indirect response by a third party, the first system generated value being greater than the second system generated value.

37. The non-transitory machine readable medium of claim 34, wherein the method bridges the first user authentication across a plurality of social networks.

38. The non-transitory machine readable medium of claim 34, wherein the authenticating process is based at least in part on determining the number of responses by third parties and the number of times the at least one associated text field is used in responses, and non-textual third party responses.

* * * * *